United States Patent
Limp et al.

(10) Patent No.: US 11,333,378 B1
(45) Date of Patent: May 17, 2022

(54) ENERGY CONSUMPTION ARTIFICIAL INTELLIGENCE

(71) Applicant: Amazon Technologies, Inc., Seattle, WA (US)

(72) Inventors: David A. Limp, Medina, WA (US); Melissa J. Cha, Medina, WA (US); Matthew Liang Chaboud, San Francisco, CA (US); Rohan Mutagi, Redmond, WA (US); Frederic Johan Georges Deramat, Seattle, WA (US); Lindo St. Angel, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/708,002

(22) Filed: Sep. 18, 2017

(51) Int. Cl.
*F24F 11/30* (2018.01)
*H02J 3/14* (2006.01)
*G06Q 50/06* (2012.01)
*G05B 13/02* (2006.01)
*F24F 11/62* (2018.01)
(Continued)

(52) U.S. Cl.
CPC .............. *F24F 11/30* (2018.01); *F24F 11/62* (2018.01); *G05B 13/0255* (2013.01); *G05B 15/02* (2013.01); *G06Q 50/06* (2013.01); *H02J 3/14* (2013.01); *B60H 1/00642* (2013.01); *F24F 11/46* (2018.01); *H02J 2310/14* (2020.01)

(58) Field of Classification Search
None
See application file for complete search history.

(56) References Cited

U.S. PATENT DOCUMENTS 6,700,333 B1   3/2004  Hirshi et al.
8,131,497 B2   3/2012  Steinberg et al.
(Continued)

FOREIGN PATENT DOCUMENTS

WO       2010103332 A1    9/2010

OTHER PUBLICATIONS

Blackford, J., "The Future of Computing: For 500,000 Years Technology has Advanced While People Remained the Same. In the next Millennium, the Human Race Plays Catch-Up," Computer Shopper, 19(12) 319, retrieved from https://dialog.proquest.com/professional/docview/668855858?accountid=142257, 1999.
(Continued)

*Primary Examiner* — Ryan A Jarrett
(74) *Attorney, Agent, or Firm* — Athorus, PLLC

(57) ABSTRACT

Described are systems, methods, and apparatus that enable power management and reduction at both the individual and group level to help reduce the overall power demand on a power system. One or more sensors may be positioned at different locations that collect and provide various sensor data to a remote computing system, referred to herein as a management system. The management system maintains location profiles for each location, user profiles for users at the various locations, and may also receive third party data, such as weather patterns, power system load, etc. The management system utilizes the received data to determine one or more energy saving actions that may be performed at the location(s) to reduce energy consumption and lower the demand on the power system.

20 Claims, 15 Drawing Sheets

(51) Int. Cl.
  *B60H 1/00* (2006.01)
  *F24F 11/46* (2018.01)
  *G05B 15/02* (2006.01)

(56) References Cited

U.S. PATENT DOCUMENTS

| | | | |
|---|---|---|---|
| 8,244,405 | B2 | 8/2012 | Kao et al. |
| 8,423,322 | B2 | 4/2013 | Steinberg et al. |
| 8,498,753 | B2 | 7/2013 | Steinberg et al. |
| 9,146,548 | B2 * | 9/2015 | Chambers .............. G05B 15/02 |
| 10,018,371 | B2 | 7/2018 | Steinberg et al. |
| 10,373,234 | B2 | 8/2019 | Depew |
| 2006/0151529 | A1 | 7/2006 | Crisp |
| 2009/0230950 | A1 | 9/2009 | Czarnecki |
| 2010/0079132 | A1 | 4/2010 | Steele et al. |
| 2012/0302092 | A1 | 11/2012 | Kaps et al. |
| 2013/0041605 | A1 | 2/2013 | Ting et al. |
| 2013/0127248 | A1 | 5/2013 | Lai |
| 2013/0132008 | A1 | 5/2013 | Borean et al. |
| 2013/0254151 | A1 * | 9/2013 | Mohagheghi ...... G06Q 30/0621 706/46 |
| 2014/0136348 | A1 | 5/2014 | Carroll et al. |
| 2014/0177737 | A1 | 6/2014 | Vasquez et al. |
| 2014/0225603 | A1 | 8/2014 | Auguste et al. |
| 2014/0333322 | A1 | 11/2014 | Kabler et al. |
| 2015/0039391 | A1 | 2/2015 | Hershkovitz et al. |
| 2015/0077243 | A1 | 3/2015 | Hooper et al. |
| 2015/0253364 | A1 | 9/2015 | Hieda et al. |
| 2015/0363866 | A1 | 12/2015 | Depew |
| 2018/0080970 | A1 | 3/2018 | Kraus et al. |
| 2020/0003659 | A1 | 1/2020 | Davies et al. |
| 2020/0149981 | A1 | 5/2020 | Koeppl et al. |

OTHER PUBLICATIONS

International Search Report and Written Opinion dated Sep. 8, 2015 for International Application No. PCT/US2015/036018, 11 pages.
P3 International, "Kill A Watt," P3 International Corporation, Copyright 2014 http://www.p3international.com/products/p4400.html (downloaded Jun. 27, 2014, by web.archive.org), 1 page.

* cited by examiner

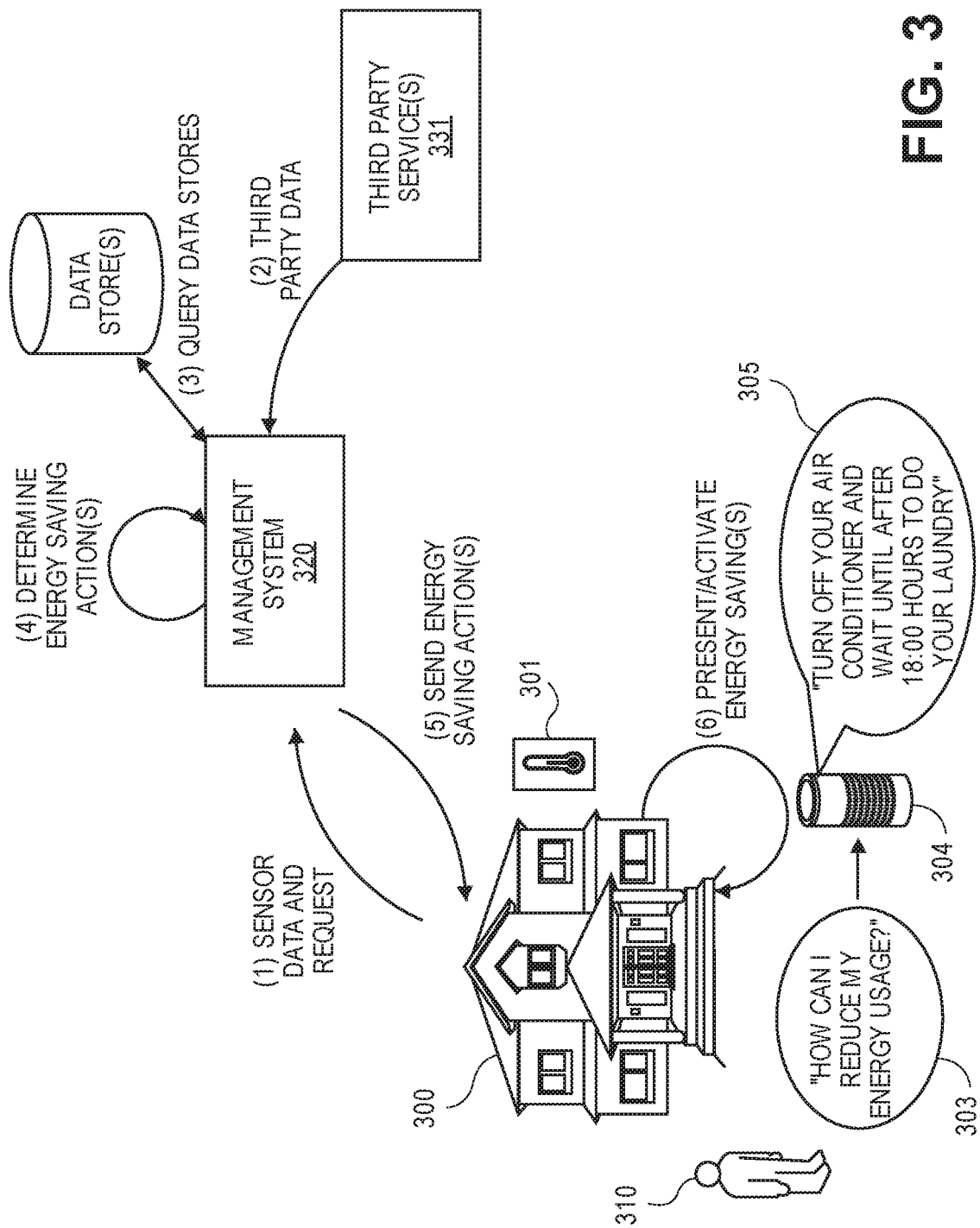

ENERGY CONSUMPTION ARTIFICIAL INTELLIGENCE

BACKGROUND

People typically use power supplied from power systems, provided using power grids, to light buildings, to heat and cool homes, to enable operation of appliances (computers, televisions, kitchen appliances, etc.). There is a price for power.

In some instances, when power demands are high, additional power sources may need to be brought online or otherwise activated to fulfill the increased demand. This can result in increased costs to the power supply companies and the users that consume that power. While some people try to self-regulate or otherwise limit their power consumption, for financial reasons or out of concern for the environment, the users often do not know when their reduced power consumption is most needed or will have the greatest beneficial impact, such as help prevent a coal power plant from being brought online. Likewise, a single individual's savings, while helpful, may not be sufficient to eliminate the need to activate an additional power station due to increased demand from other users. Described herein are innovative technical solutions to solve problems presented in these and other situations.

BRIEF DESCRIPTION OF DRAWINGS

The detailed description is described with reference to the accompanying figures.

FIG. 3 illustrates an example messaging exchange as part of a responsive energy saving process at a location, in accordance with described implementations.

DETAILED DESCRIPTION

Figure 1:
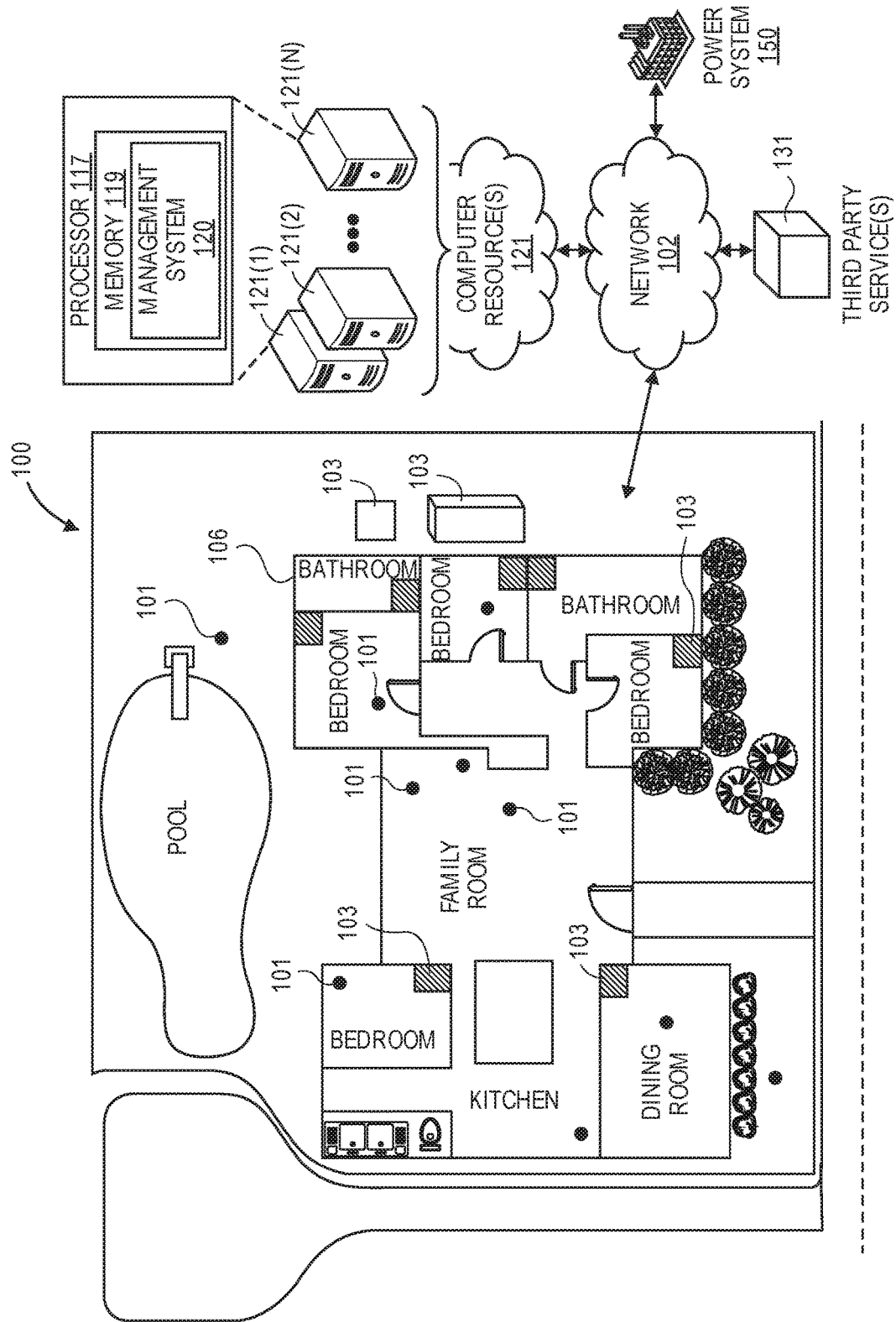
FIG. 1 is a block diagram of a location for which energy consumption is to be monitored and/or reduced, in accordance with described implementations.

Described are systems, methods, and apparatus that enable power management and reduction at both the individual and group level to help reduce the overall power demand on a power system and provide energy savings to users. One or more sensors may be positioned at different locations (e.g., homes, offices) that collect and provide various sensor data to a remote computing system, referred to herein as a management system. The management system maintains location profiles for each location, user profiles for users at or associated with the various locations, and may also receive third party data, such as weather patterns, power system load, etc. The location profiles may identify characteristics about each location, including the position and/or types of sensors, identification of appliances at the location that are controllable by the management system (either directly or indirectly), the size of a structure at the location, identification of users that occupy the location, the orientation of the location, the altitude of the location, etc.

The management system processes the received information and determines one or more energy saving actions that may be performed at the different locations to reduce the overall power consumed by those locations. Upon determining one or more actions for a location, the management system communicates with a device at the location to either present or recommend the one or more energy saving actions or to automatically alter an operation of one or more appliances at the location in accordance with an energy saving action. For example, the management system may determine from first sensor data that the external temperature at the location has increased by ten degrees and determine from second sensor data that the user that occupies the location is not present at the location. In addition, the management system may receive power load information from the power system indicating that the demand for power is increasing such that an additional power station will need to be activated to fulfill the demand.

In response to the received information, the management system may determine that a power savings can be realized at the location by altering the threshold temperature of the heating, ventilation, and conditioning ("HVAC") appliance at the location so that it will not activate and consume additional power. The management system may also cause the window blinds (an appliance) to lower to reduce any heat increase within the structure at the location resulting from the increased external temperature. Based on the determined energy saving actions, a recommendation may be provided to a user associated with the location and/or instructions may be sent by the management system to cause the HVAC and/or blinds to alter operation in accordance with the energy saving actions.

In some implementations, the management system may include one or more locations in a group of locations. A group of locations may include one location, hundreds of locations, or any number of locations that receive power from the same power system. In such a configuration, the management system may determine one or more incentives that may be used to incent locations of a group to comply with determined energy saving actions that are proposed to the group. For example, the management system may determine that power demand on a power system needs to be reduced by a certain percentage, otherwise an additional power station will need to be activated to fulfill the demand, thereby increasing the cost for the power to both the user and the power system. To help control the demand, the management system may determine a total energy savings needed by the group of locations, an incentive to provide to the group, and request that the group perform one or more energy saving actions to collectively reduce the group energy consumption. The incentive may be, for example, a cost savings that is provided to the users in exchange for the reduced power consumption that, in turn, reduces the cost to the power system by not having to activate another power station.

In some implementations, the recommended energy saving actions may be audibly presented to a user at the location, or a user associated with the location, and the user may audibly respond to accept, decline, or modify the recommendation. Likewise, in some implementations, a user may submit a request to the system inquiring how they can help save energy by providing an audible input to the system. Automatic speech recognition (ASR) and/or natural language understanding (NLU) may be used to determine responses and/or requests from users based on the utterances and/or other audible input provided by the user to the system. ASR is a field of computer science, artificial intelligence, and linguistics concerned with transforming audio data associated with speech into text representative of that speech. Similarly, NLU is a field of computer science, artificial intelligence, and linguistics concerned with enabling computers to derive meaning from text input containing natural language. ASR and NLU are often used together as part of a speech processing system.

FIG. 1 is a block diagram of a location 100 for which energy consumption is to be monitored and reduced, in accordance with described implementations. In this example, the location is a home location that includes a structure 106 in the form of a personal residence. It will be appreciated that the location and corresponding structure may be any location or structure for which energy consumption is to be monitored and/or managed with the described implementations. For example, the location may be residential, business, commercial, public, etc. Likewise, the structure may be a personal residence, apartment, office building, government building, municipal building, entertainment facility (e.g., coliseum, stadium), shopping facility, etc.

One or more sensors 101 may be positioned at the location, some of which may be internal or inside the structure 106, and some of which may be external or outside of the structure 106. Any number, type, or combination of sensors may be positioned at any of a variety of positions at the location. For example, one or more temperature sensors may be positioned in each room of the structure 106, each of which collect and provide sensor data indicating the temperature as measured by the sensor. The sensors may be independent or stand-alone sensors or integrated with other appliances. For example, a temperature sensor may be included in a communication component that is used to provided audible outputs to a user at the location and/or receive inputs from the user, as discussed further below. In other examples, sensors may be incorporated into the structure itself. For example, a temperature sensor and/or light sensor may be included in the walls or ceiling of the structure. As discussed below, the sensors may be configured to communicate with other sensors and/or a communication component to provide sensor data, which is ultimately provided to a management system 120 executing on one or more remote computer resources 121. For example, the sensors may be configured to form a wireless mesh network that enables the sensors to provide sensor data to other sensors and propagate received sensor data to the communication component so that the sensor data can be sent to the management system 120. Example sensors are discussed further below with respect to FIG. 2.

Likewise, each location includes one or more appliances 103 that consume variable amounts of energy based on their usage. Like the sensors, the appliances may be internal or inside the structure 106, or external or outside the structure 106, and may provide various functions. In some implementations, the appliances may be configured to communicate with a communication component to either receive operation instructions and/or to provide usage information. As sensor data is collected by various sensors at the location 100, the sensor data is provided to the management system 120 via a network 102, such as the Internet. Example appliances are discussed further below with respect to FIG. 2.

The system may also include computing resource(s) 121. The computing resource(s) 121 are remote from the location 100. Likewise, the computing resource(s) 121 may be configured to communicate over a network 102 with the location 100, the sensors 101, and/or the appliances 103. Likewise, the computing resource(s) 121 may communicate over the network 102 with one or more power systems 150, and/or one or more third party service(s) 131.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may process sensor data received from sensors 101 at various locations 100, data from third parties 131 and/or data from the power system 150 to determine energy saving actions that may be performed by altering an operation of one or more appliances 103 at the location 100. The server system(s) 121 does not require end-agent knowledge of the physical location and configuration of the system that delivers the services. Common expressions associated for these remote computing resource(s) 121 include "on-demand computing," "software as a service (SaaS)," "platform computing," "network-accessible platform," "cloud services," "data centers," and so forth. Each of the servers 121(1)-(N) include a processor 117 and memory 119, which may store or otherwise have access to a management system 120, as described herein.

The network 102 may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 2:
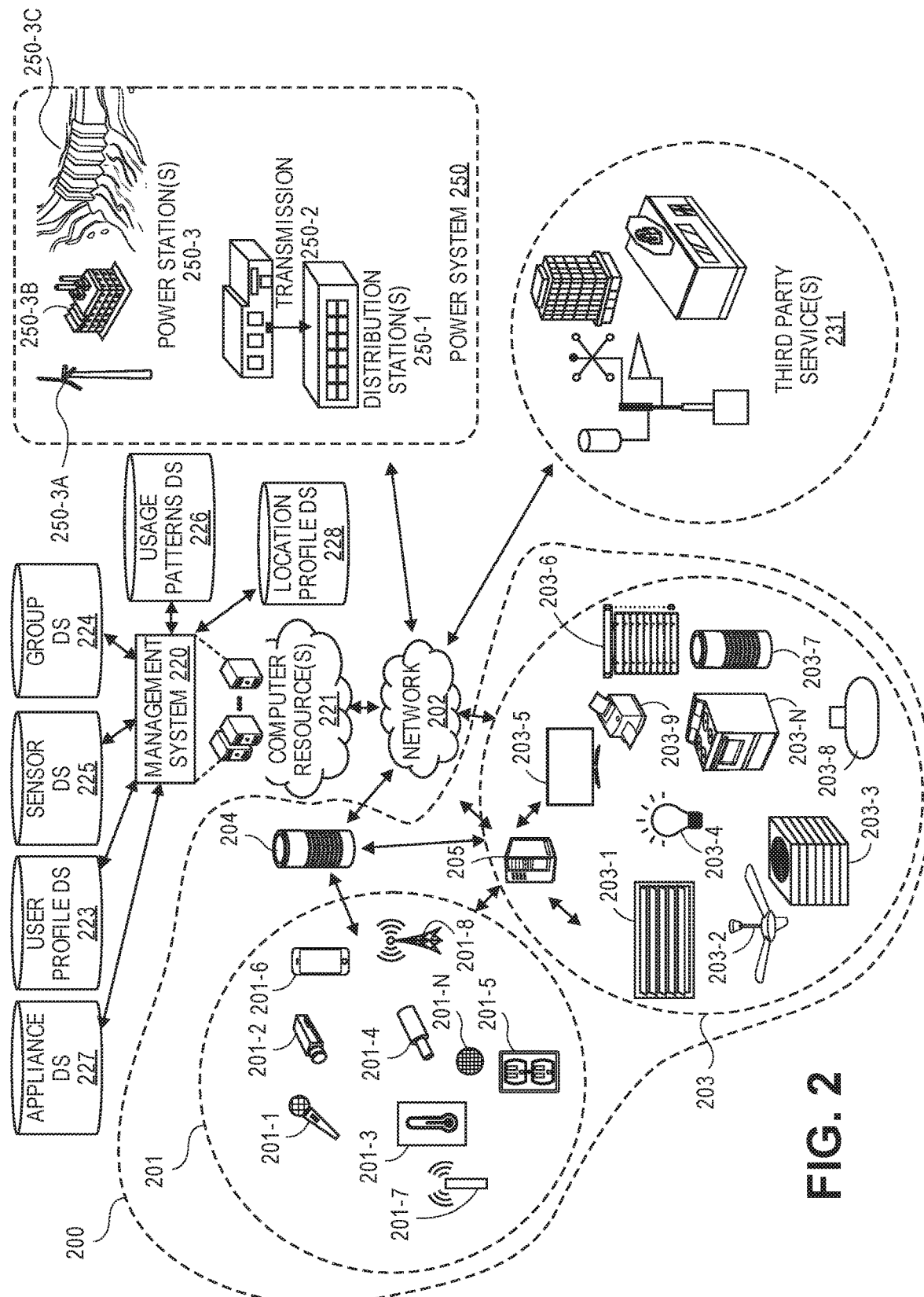
FIG. 2 illustrates example sensors and appliances of the location illustrated in FIG. 1 and the communication paths with remote systems and services, in accordance with described implementations.

FIG. 2 illustrates additional details of example sensors 201, appliances 203, third party systems 231, and the power system 250 illustrated in FIG. 1 and the communication paths therebetween, in accordance with described implementations. Example sensors that may be positioned at a location include, but are not limited to, a microphone 201-1, camera 201-2, temperature sensor 201-3, pressure sensor 201-4, electrical outlet sensor 201-5, portable device 201-6, vibration sensor 201-7, location sensor (e.g., IP address, Wi-Fi, global positioning system (GPS)), a light sensor 201-N, etc. In some implementations, one or more sensors may be integrated or connect to a breaker box or power panel at the location to measure and report the amount of energy consumed by various circuits at the location. As another example, one or more sensors may be integrated or connected with a power meter at the location to measure and report readings from the power meter to the management system 220. As will be appreciated, any number and/or types of sensors may be positioned at a location to collect corresponding sensor data that is utilized with the described implementations.

The sensors may by powered by the power system, by battery power, and/or powered from other devices or components. For example, the electrical outlet sensor, may harvest power from the electrical outlet to power the sensor, which may be an electricity meter for the outlet, and/or any other type of sensor. As another example, one or more of the sensors may receive power wirelessly from another device using wireless power transfer (WPT) using electric, magnetic, or electromagnetic fields using inductive coupling between coils of wire or by electric fields using capacitive coupling between metal electrodes, or using other WPT techniques. In other implementations, the sensors may be incorporated or included in other appliances (e.g., televisions, communication components 204, and receive power from those appliances). Likewise, the sensors may be stationary at fixed locations, such as a wall mounted temperature sensor, or sensors may be portable, such as a sensor included in a portable computing device (e.g., smart phone).

In addition to collecting sensor data, the sensors 201 may be configured to communicate with other sensors and/or communicate with a communication component 204 that is also positioned within the location. For example, the sensors 201 may form a wireless mesh network and provide sensors data among the mesh network. Likewise, the communication component 204 may also be included in the mesh network and eventually receive the sensor data that is transmitted via the mesh network and send the sensor data to the computer resources 221 via the network 202. Any form of wired and/or wireless communication may be utilized to facilitate communication between the devices, sensors and/or appliances. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices and one or more sensors and/or appliances.

The sensor data may include, among other information, a sensor identifier that uniquely identifies the sensor, a timestamp or time indicator indicating a time or timeframe during which the sensor data was collected, and/or other information. In some implementations, the sensors may be configured to measure the environment or condition at a periodic interval (e.g., every 30 seconds) and include the measurement in the sensor data. Likewise, the sensor measurements may be maintained by the sensor and accumulated into sensor data that includes multiple sensor measurements. At a defined period of time (e.g., every 30 minutes), the sensor data may be transmitted by the sensor to other sensors and/or to the communication component 204. A sensor, upon receiving sensor data from another sensor may forward the sensor data to other sensors or to the communication component so that the transmitted sensor data from all sensors at the location are propagated to the communication component.

Appliances 203 at a location may include any one or more items that consume energy during operation. Appliances may include, but are not limited to adjustable vents 203-1, ceiling fans 203-2, HVAC 203-3, lights 203-4, televisions 203-5, window blinds 203-6, pool pumps or heaters 203-7, hot water heaters 203-8, office equipment, such as computers or printers 203-9, kitchen appliances 203-N (e.g., microwave, stove, refrigerator, freezer), etc. In some implementations, the appliances may be connected appliances capable of receiving instructions, referred to herein as command data, from the management system 220, via a communication hub 205, via the communication component 204, and/or directly. In other implementations, one or more appliances may not be connected and may only be controllable by either a user at the location and/or by controlling the circuit that provides power to the appliance.

Connected appliances 203 are configured to receive and execute instructions included in command data sent from the management system 220 operating on a remote computing resource directly, via the hub 205 that is positioned at the location, and/or via the communication component that is positioned at the location. Likewise, in some implementations, the appliances may be further configured to transmit or send operational information (e.g., energy consumption, errors, etc.) to the management system and/or the communication component 204.

In some implementations, the communication hub 205 may forward sensor data received from the various sensors to the management system for processing by the management system 220 and/or forward command data received from the management system 220 to various appliances 203 for execution. In other implementations, some or all of the processing of the sensor data may be performed by the communication hub 205. For example, the communication hub 205 may receive sensor data from appliances and determine if there are one or more actions that are to be performed by one or more of the appliances based on the received sensor data. If one or more actions are to be performed, the communication hub 205 may send command data to the appropriate appliance(s) to execute those actions. As another example, the communication hub may compare sensor data received from an appliance 203 with prior sensor data from that appliance to determine if a change in the sensor data exists. If a change in the sensor data exists, the sensor data may be sent by the communication hub 205 to the management system 220 for further processing. If no change in the sensor data exists, the communication hub 205 may not forward the sensor data to the management system 220.

In still other examples, the communication hub 205 may process the sensor data to determine an event representative of the sensor data and send an event identifier to the management system. For example, the communication hub 205 may receive audio data from a microphone 201-1 and process the audio data to determine footsteps (an event) are detected in the audio data. Rather than sending the audio data to the management system 220, the communication hub 205 may send an event identifier indicating the occurrence of the event, in this example, footsteps. Any form of sensor data, such as audio, video, temperature, etc., may be processed by the communication hub 205 to detect events. Processing of the sensor data by a communication hub 205 positioned at the location and transmitting event identifiers representative of events detected in the processed sensor data to the management system 220, rather than sending the sensor data, reduces the amount of data sent between the communication hub 205 and the management system 220 and also reduces any privacy or security concerns relating to the transmission of sensor data from the location to the management system.

In some implementations, one or more energy saving actions to be performed by one or more appliances at a location may be determined for a future point in time, upon satisfaction of a condition, and/or upon the occurrence of an event. In such implementations, command data that includes instructions that will cause a programmatic alteration of operation of an appliance may be sent and stored at the location for future execution by the appliance at the future point in time, when the condition is satisfied, and/or upon the occurrence of an event. For example, command data and/or message data (discussed below) that includes instructions for altering operation of one or more appliances at a future time, upon satisfaction of a condition, and/or upon the occurrence of a future event may be generated and sent to the communication hub 205 at the location and stored in memory by the communication hub 205 until the future point in time, condition satisfaction, and/or event occurrence. At the future point in time, condition satisfaction and/or event occurrence, the communication hub may send the command data to the appropriate appliance(s) at the location to cause programmatic alteration of operation of the appliance in accordance with the instructions in the command data. Alternatively, or in addition thereto, the communication hub may send message data to a communication component 204 that is output by the communication component as a presented recommendation to a user at the location. In still other examples, command data may be sent directly to the appliance(s) and include an execution indicator indicating to the appliance when the command data is to be executed by the appliance(s). For example, the execution indicator may be a time or value that, when reached, will result in the appliance executing the instructions included in the command data.

As will be appreciated, some or all of the processing of sensor data may be performed at the communication hub 205, at the management system 220, and/or a combination of the communication hub 205 and the management system 220.

Third party systems 231 that may provide data to the management system 220 include any type of system or service that is independent of the location that provides data that may be used by the management system 220 to determine energy saving actions that may be performed by one or more appliances at the location. For example, the third-party system 231 may be a weather system that provides weather data, weather patterns, or forecasted weather corresponding to the location that may be used by the management system 220 to determine one or more energy saving actions that may be performed by one or more appliances at the location. In another example, the third-party system may be a home monitoring service, such as an alarm monitoring service, a power system that monitors or records energy consumption, etc.

The power system 250 may also communicate with the management system 220 and provide demanded power information, or load on the power system, forecasted power demands, costs per unit of power under different operational constraints, etc. For example, the power system 250 may provide information to the management system indicating which power stations are currently operating, the cost per unit of energy produced, and the current load on the power station, also referred to herein as load value. Likewise, the power system 250 may also provide information indicating the amount of demand that will require activation of an additional power station, and the unit cost when both power stations are operating.

A power system 250 typically includes one or more power station(s) 250-3, transmission station(s) 250-2, and distribution station(s) 250-1. Locations, such as location 200 create demand for power provided by the power system 250 and pay for that power.

Power stations 250-3 may include any form of power generation. For example, a power station 250-3 may be a wind based power station 250-3A, such as a wind farm, a fossil-fuel based power station 250-3B, a hydroelectric power station 250-3C, a solar power station, a nuclear power station, etc. The power system 250 may include any number and type of power stations 250-3.

Electric-power generated by the power stations 250-3 is bulk transmitted at high-voltages via a series of transmission 250-2 lines and stations from the generating power stations 250-3 to distribution stations 250-1. Transmission 250-2 lines and stations when interconnected with each other create transmission networks, which are often referred to as "power grids." The United States has three major power grids, the Western Interconnection, the Eastern Interconnection and the Electric Reliability Council of Texas (ERCOT) grid, often referred to as the Western Grid, the Eastern Grid and the Texas Grid.

The distribution stations 250-1 are located near the locations 200 that create the demand for the power. The distribution stations 250-1 receive the bulk transmissions, step down the voltage and distribute the electricity to end locations 200, such as residential housing, businesses, commercial buildings, etc.

A few of the major constraints with power systems is that power within the system must run at the same frequency and, with only a few exceptions, electrical energy cannot be stored. As such, power must be generated and supplied in real-time at a rate that matches demand. If the demand for power exceeds supply, additional power stations 250-3 must be activated to fulfill the additional demand, or brownouts or blackouts may be experienced at numerous locations that rely upon that power. The distribution stations typically charge the locations for the consumption of energy as a measure of kilowatt-hours (kWh), which is a measure of energy. The rate per kWh generally varies based on the current power demand or load of the power system and/or based on the average or expected power demand on the power system. As the power demand on the power system 250 increases, the cost per unit of energy consumed by each location likewise typically increases.

The implementations described herein receive the sensor data from one or more locations, the third-party data, and data from the power system and process that data to determine energy saving actions that may be performed by appliances at the one or more locations to reduce the amount of consumed energy, thereby reducing the demand on the power system and potentially to cost of each unit of energy. In some implementations, these cost savings may be shared with users at the locations in the form of decreased bills from the power system, etc.

The management system 220 may also maintain data stores, such as an appliance data store 227, a user profile data store 223, a sensor data store 225, a group data store 224, a usage pattern data store 226, and/or a location profile data store 228. As discussed further below with respect to FIG. 11, the various data stores maintain current, historical, and projected future information about the locations, sensors, appliances, etc., that may be used by the management system 220 to determine one or more energy saving actions that may be performed by one or more appliances at one or more locations, during a particular period of time to reduce the power demand on the power system 250 and/or to reduce the cost of energy provided to one or more locations.

For example, the management system 220 may process received and stored data to determine that during the next three hours (e.g., 14:00-17:00 pm) there is typically a high demand on the power system 250 when the external temperature exceeds thirty-two degrees Celsius. In addition, the management system may determine from the sensor data received from the location 200 that a user at the location is preparing to, or based on historical information often runs the washing machine and dryer (appliances) between 14:00-17:00 hours. If the sensor data received from one or more sensors 201 at the location 200 or data received from a third-party system 231 indicates that the external temperature at the location is expected to exceed thirty-two degrees Celsius between 14:00 and 17:00 hours, the management system 220 may recommend to a user at the location that the user delay use of their washer and dryer to sometime after 17:00 hours, thereby reducing the power demand on the power system 250. Alternatively, or in addition thereto, command data may be sent to the location and executed by the appliances, in this case a washer and dryer. In this example, the instructions in the command data will result in a delayed start or operation of the appliance until after the determined time (e.g., 17:00 hours). The command data may be any form of data or instructions that may be utilized to cause programmatic altering of operation of one or more appliances.

Such processing may be performed by the management system for numerous locations and various energy saving actions may be determined and suggested to users at those various locations. If multiple locations comply with the recommended energy saving actions, the total power demand on the power system 250 may be reduced by a desired or needed amount. In some implementations, as discussed below, locations may be associated with groups and incentives may be provided to locations associated with the group that incent the group to comply with the recommendations. In other implementations, the incentives may be provided on a location by location basis.

As discussed further below, the energy saving actions may be determined on a proactive basis, such as the example provided above, or a responsive basis in response to a request by a user. For example, FIG. 3 illustrates an example messaging exchange as part of a responsive energy saving process at a location 300, in accordance with described implementations. In this example, a user 310 at a location 300 provides an audible output 303 to the communication component 304 inquiring "How can I reduce my energy usage?" Any variety of audible outputs may be provided and responded to with the disclosed implementations. In other examples, outputs provided to the communication component 304 may include, but are not limited to, "How much energy did I consume yesterday?," "How does my energy consumption compare to others?," etc.

The communication component 304, upon receiving an audio input, processes the audio using ASR and/or NLU to understand the request. Upon determining the request, the communication component receives or obtains sensor data from one or more sensors 301 at the location and sends the request, or an indication representative of the request, and the sensor data to the management system 320. The management system, may also receive third party data, such as weather information relevant to the location, from a third-party system 331. In addition, the management system 320 may also obtain a location profile from one or more data stores corresponding to the location 300 and/or obtain a user profile corresponding to the user 310. The information obtained from the data store may indicate one or more user preferences, and/or characteristics of the location.

The location profile may indicate, for example, the type of structure at the location, the size of the structure, the building materials, the altitude, the orientation of the structure, the appliances at the structure, the sensors at the structure, the amount of energy saved by altering the power provided to one or more appliances during environment conditions similar to the current environment conditions, etc. As discussed below, location profiles may be stored in the data store and used as inputs to predict energy saving from various energy saving actions when different conditions are present at the location. Such information may be used to predict energy savings at the same location and/or at other locations having similar characteristics.

The sensor data received from the location, the third-party data, and the information obtained from the data store is processed by the management system 320 to determine one or more energy saving actions that may be performed at the location to reduce energy usage at the location. In some implementations, an inconvenience to the user 310 may be determined for each energy saving action, and the energy saving actions may be ranked based user preferences corresponding to the user that are maintained in the data store and known to the management system. The ranking of the energy saving actions may be also based on the amount of energy savings each energy saving action will realize, thereby providing a balance between energy savings and inconvenience to the user. Finally, one or more of the energy saving actions may be sent by the management system 320 to the communication component 304 and presented to the user 310 by the communication component 304. For example, message data may include synthesized speech that is to be audibly output by the communication component 304 as a presented recommendation of an energy savings action. In other examples, the message data may include other forms of information that may be output as a presentation to the user at a location. For example, message data may include instructions that cause a communication component to generate a light output, such as a light ring or light ring pattern, visual information that is presented on a graphical user interface, etc. In some implementations, rather than or in addition to sending message data to the communication component, the message data may be sent to other computing devices, such as a mobile device associated with the user, that may then output the message data for presentation to the user. For example, message data may be sent as a short message or text message, multimedia message, etc., to a portable device (e.g., smart phone) associated with the user and presented to the user by the portable device. As can be appreciated, message data may include any form of information that can be presented to a user.

In the example discussed with respect to FIG. 3, the energy saving action is presented as an audible output 305 in the form of a recommendation, "Turn off your air conditioner and wait until after 18:00 hours to do your laundry," to the user 310 at the location 300. In some implementations, the user may respond to the communication component 304 and, if the response is an affirmative to perform the actions, the communication component and/or the management system 320 may send command data to one or appliances to cause a programmatic altering of operation of the one or more appliances in accordance with the energy saving action that was affirmed. For example, if the user 310 agrees to turn off the air conditioner, command data may be send to the HVAC to shut off. Alternatively, in the example of an HVAC appliance, command data may be sent to a component in electrical communication with the HVAC that temporarily disables the operation of the HVAC. In some implementations, command data and/or message data corresponding to recommended energy saving actions may be provided by the management system to the communication component along with the energy saving action recommendations. In other implementations, command data may be sent by the management system 320 directly to the appliances in response to an affirmation from the user 310 to perform the recommended energy saving action(s).

Figure 4A:
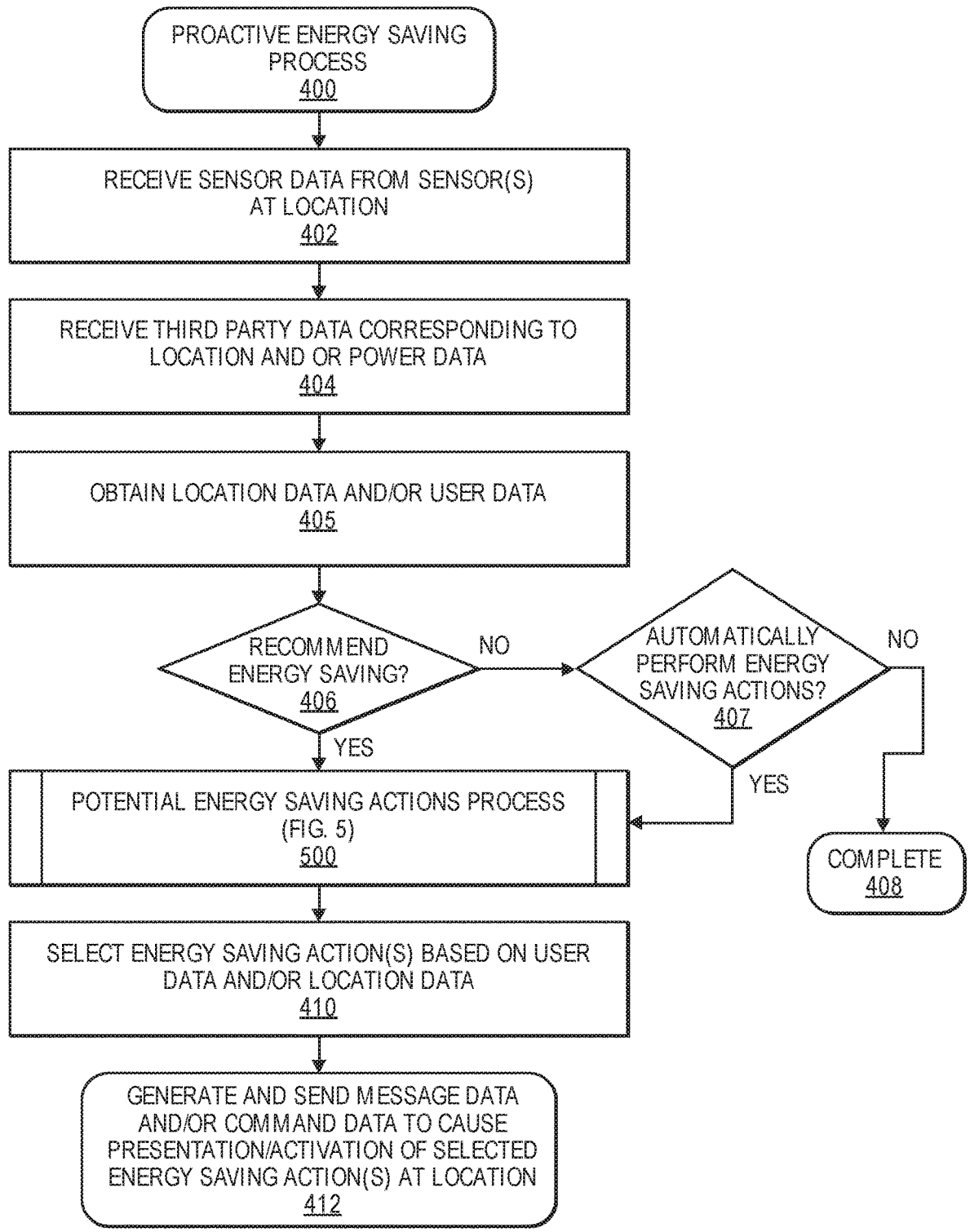
FIG. 4A illustrates an example proactive energy saving process, in accordance with described implementations.

FIG. 4A illustrates an example proactive energy saving process 400, in accordance with described implementations. The example process 400 may be performed by the management system executing on one or more computing systems that are remote from the location. The example process 400 begins by receiving sensor data from one or more sensors positioned at a location, as in 402. As discussed above, sensors may measure various conditions at a location and provide those measurements in the form of sensor data (e.g., sensor data values) at various intervals. In some implementations, sensor measurements may be provided in real-time or near real time to a management system at a remote location. In other implementations, a sensor may periodically measure a condition and send multiple measurements at defined intervals to the management system.

In addition to receiving sensor data from one or more sensors at the location, third party data corresponding to one or more actual or anticipated conditions at the location may be received, as in 404. Likewise, power data corresponding to the current, average, and/or anticipated power demand or power load (e.g., power load value) at a power station that services the location may also be received, as in 404.

In addition, the example process 400 may also obtain, from a data store, location data corresponding to the location and/or user data for one or more users associated with or determined to be at the location, as in 405. The location data may include characteristics about the location. Such information may be independent of time or other conditions (e.g., size of structure at location, building materials, altitude, orientation), or time and/or condition dependent (e.g., average energy consumption at particular times and/or during particular weather conditions, illumination or light measurements, motion detection during different times, etc.). The user data may indicate user preferences, such as what appliances the user is willing to alter for energy savings, time periods during which the user is willing to receive energy saving recommendations, etc.

Based on the received sensor data, third party data, and obtained location data and/or user data, a determination is made as to whether a recommendation for one or more energy saving actions is to be determined and provided to the location and/or to a user associated with the location, as in 406. For example, if the user data indicates that the user is willing to receive recommendations between 17:00-22:00 hours, the current time is 18:15 hours, and the power data from the power system indicates a predicted high-power demand between 18:30-19:30, it may be determined that an energy saving action is to be determined and recommended to the location or a user associated with the location. As will be appreciated, any number of factors may be considered in determining whether an energy saving action is to be determined and recommended to the location and/or a user associated with the location.

If it is determined that an energy saving action is not to be determined and recommended to the user, a determination is made as to whether an energy saving action is to be determined and automatically performed at the location, as in 407. For example, the location data and/or the user data may indicate that energy saving actions may be automatically performed at the location when defined conditions are satisfied. For example, the user data may indicate that an energy saving action of shutting off or altering the operation of an HVAC system at the location may be performed when the user or sensor data indicates that the user is not at the location.

If it is determined that an energy saving action is not to be determined and automatically performed, the example, process 400 completes, as in 408. However, if it is determined that an energy saving action is to be determined and recommended to the user, as in decision block 406, or that an energy saving action is to be determined and automatically performed, as in decision block 407, an example potential energy saving actions process is performed, as in 500. The example potential energy saving actions process 500 is discussed in further detail below with respect to FIG. 5.

The potential energy saving actions process 500 determines and provides one or more energy saving actions that may be performed by one or more appliances at the location. Likewise, the energy saving actions process may also determine and provide, for each determined energy saving action, an expected amount of energy savings (e.g., energy savings value) and/or an expected inconvenience to users at the location.

Upon determination and receipt of potential energy saving actions, one or more of those energy saving actions are selected based on the obtained user data and/or the obtained location data, as in 410. For example, the example process 400 may rank or sort the determined energy saving actions based on a variety of factors including, but not limited to, user preferences, current conditions at the location, the expected energy savings, the expected inconvenience, etc. For example, the example process 400 may determine from the user data that only one of the determined energy saving actions are to be selected based on historical information collected about the location or a user at or associated with the location. In some implementations, an energy saving action may relate to or include instructions for multiple appliances. For example, an energy saving action may include instructions to shut off the lights within the interior of the structure and to adjust the HVAC temperature setting.

Finally, message data representative of the selected energy saving action(s) is generated and sent to the location for presentation as recommendations to the location or a user associated with the location in instances where it is determined that the actions are to be recommended, and/or command data that includes instructions that will programmatically alter operation of one or more appliances is generated and sent to the location to cause the appliance(s) to alter operation, as in 412. For presentation of the energy saving actions, the example process may provide message data that includes information in any variety of forms. For example, the message data that includes recommended energy saving action(s) may be presented audibly by a communication component at the location, may be presented visually by a device associated with the location, may be sent to the user as a text message, etc. If the energy saving action(s) is to be performed automatically, command data may be sent to the appliance that is to perform the energy saving action to cause programmatic alteration of operation of the appliance in accordance with the energy saving action.

Figure 4B:
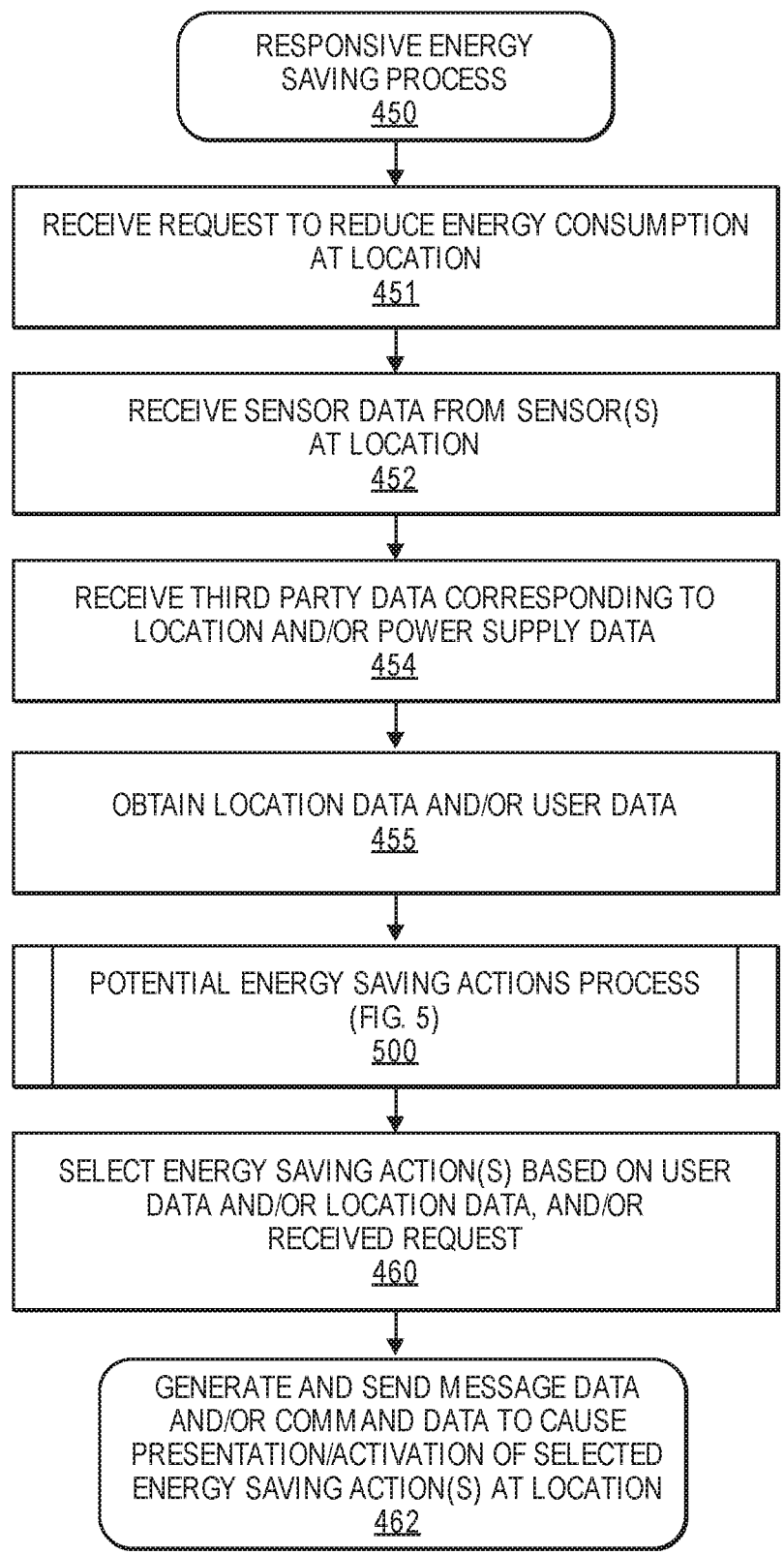
FIG. 4B illustrates an example responsive energy saving process, in accordance with described implementations.

FIG. 4B illustrates an example responsive energy saving process 450, in accordance with described implementations. The example process 450 may be performed by the management system executing on one or more computing systems that are remote from the location. The example process 450 begins by receiving a request to reduce energy consumption at a location, as in 451. The request may be received from a user associated with the location or from a third-party system that monitors or is otherwise associated with the location.

In response to receiving the request, sensor data from one or more sensors positioned at a location is received, as in 452. As discussed above, sensors may measure various conditions at a location and provide those measurements in the form of sensor data (e.g., sensor data values) at various intervals. In some implementations, sensor measurements may be provided in real-time or near real time to a management system at a remote location. In other implementations, a sensor may periodically measure a condition and send multiple measurements at defined intervals to the management system.

In addition to receiving sensor data from one or more sensors at the location, third party data corresponding to one or more actual or anticipated conditions at the location may be received, as in 454. Likewise, power data corresponding to the current, average, and/or anticipated power demand or power load (e.g., power load value) at a power station that services the location may also be received, as in 454.

The example process 450 may also obtain, from a data store, a location profile corresponding to the location and/or a user profile for one or more users associated with or determined to be at the location, as in 455. The location profile may include characteristics about the location. Such information may be independent of time or other conditions (e.g., size of structure at location, building materials, altitude, orientation), or time and/or condition dependent (e.g., average energy consumption at particular times and/or during particular weather conditions, illumination or light measurements, motion detection during different times, etc.). The user data may indicate user preferences, such as what appliances the user is willing to alter for energy savings, time periods during which the user is willing to receive energy saving recommendations, etc.

Upon receiving the sensor data, the third-party data, power supply data, location profile, and/or user profile, an example potential energy saving actions process is performed, as in 500. The example potential energy saving actions process 500 is discussed in further detail below with respect to FIG. 5.

The potential energy saving actions process 500 determines and provides one or more energy saving actions that may be performed by one or more appliances at the location. Likewise, the energy saving actions process may also determine and provide, for each determined energy saving action, an expected amount of energy savings (e.g., energy savings value) and/or an expected inconvenience to users at the location.

Upon determination and receipt of potential energy saving actions, one or more of those energy saving actions are selected based on the obtained user data, the obtained location data, and/or the received request, as in 460. For example, the example process 450 may rank or sort the determined energy saving actions based on a variety of factors including, but not limited to, user preferences, current conditions at the location, the expected energy savings, the expected inconvenience, etc. For example, the example process 450 may determine from the user data that only one of the determined energy saving actions are to be selected based on historical information collected about the location or a user at or associated with the location.

Finally, message data representative of the selected energy saving action(s) is generated and sent to the location for presentation as recommendations to the location, a user, and/or a third party associated with the location (e.g., the user or third party that provided the request), as in 462. For presentation of the energy saving actions, the example process may provide message data that includes information in any variety of forms. For example, the recommended energy saving action(s) may be presented audibly by a communication component at the location, may be presented visually by a device associated with the user, may be sent to the user as a text message, etc.

Figure 5:
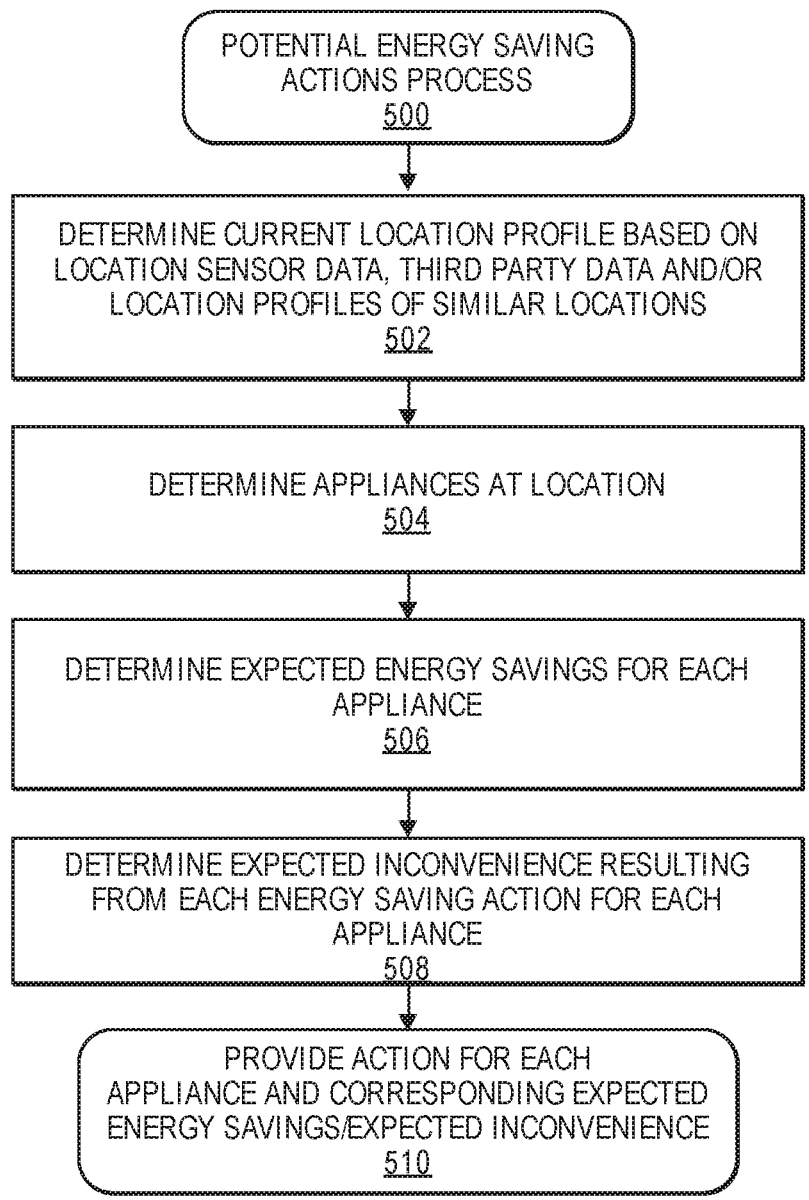
FIG. 5 illustrates an example potential energy saving actions process, in accordance with described implementations.

FIG. 5 illustrates an example potential energy saving actions process 500, in accordance with described implementations. The potential energy savings actions process 500 may be performed by the management system any time it is determined that an energy saving action(s) is to be determined for a location. The example process determines a current location profile based on location sensor data, third party data, and/or location profiles of similar locations, as in 502. For example, a location profile may indicate characteristics of the location that are independent of time (e.g., size of a structure, shape of the structure, altitude, orientation, etc.). Such information may be used to determine other locations with similar characteristics for which energy savings and/or other sensors measurements are known for current environmental conditions. Such information may then be used by the management system to establish a current location profile for the location. The current location profile may include sensor data from the location and/or sensor data expected at the location, based on actual data obtained from other, similar locations, under similar environmental conditions.

The example process also determines appliances at the location, as in 504. Appliances may be connected appliances, which are appliances that can be controlled by the management system, either directly or indirectly, or other appliances that are known to be at the location (e.g., based on information provided by the user). As discussed above, an appliance may be anything that consumes power from the power system.

Utilizing the location profile and knowledge of the appliances, which may be included in the location profile, collected from other locations, or obtained from a source (e.g., manufacturer) of the appliance, an expected energy savings is determined for each appliance, as in 506. For example, if the location includes a large window air conditioner that has a power rating of 1500 watts would save 7.5 kWh if it was shut off for five hours (watts, times hours used, divided by 1000). In comparison, a 100-watt light bulb would only save 0.5 kWh if shut off for five hours.

In addition, the example process 500 determines an expected inconvenience resulting from the energy saving action for each appliance, as in 508. In some implementations, based on the current location profile and/or data from comparable/similar locations during similar environment conditions, a change at the location by altering an operation of an appliance may be predicted and a corresponding inconvenience determined. In some implementations, inconveniences may be qualified into different levels (e.g., low, medium, high). For example, if the external temperature is thirty-two degrees Celsius, the current internal temperature within the structure at the location is twenty degrees Celsius, and the location profile information indicates that the internal temperature will rise by five degrees if the HVAC is shut off for five hours, the inconvenience may be classified as low or medium. In comparison, if the location profile indicates that the internal temperature will rise by seventeen degrees, to thirty-seven degrees Celsius, the inconvenience may be qualified as high.

Finally, an energy saving action for each appliance and corresponding expected energy savings and/or expected inconvenience may be provided, as in 510.

While the above examples have described determining energy saving actions and providing those energy saving actions to a specific location, such implementations may likewise be utilized at a group level, with each group containing any number of locations. In such an implementation, the energy savings may be considered and determined on a group level based on expected energy savings realized from each location in the group and/or based on a percentage of cooperation of the group. Managing energy savings at a group level may be beneficial to realize larger total energy savings at particular times, such as when power demand at a power station is expected to reach its peak and/or cause an additional power station to be activated. Likewise, incentives may be provided if a group energy savings is realized to further incent members of the group to comply with the energy savings recommendations and to cooperate and encourage other members to comply. While the energy savings may be determined at a group level, the above example methods and systems may be utilized for each location of the group to determine energy saving actions to be performed at that location to further the group's goal of energy reduction. As such, different locations within the group may receive different energy saving actions and/or produce a larger energy savings than other locations.

Figure 6:
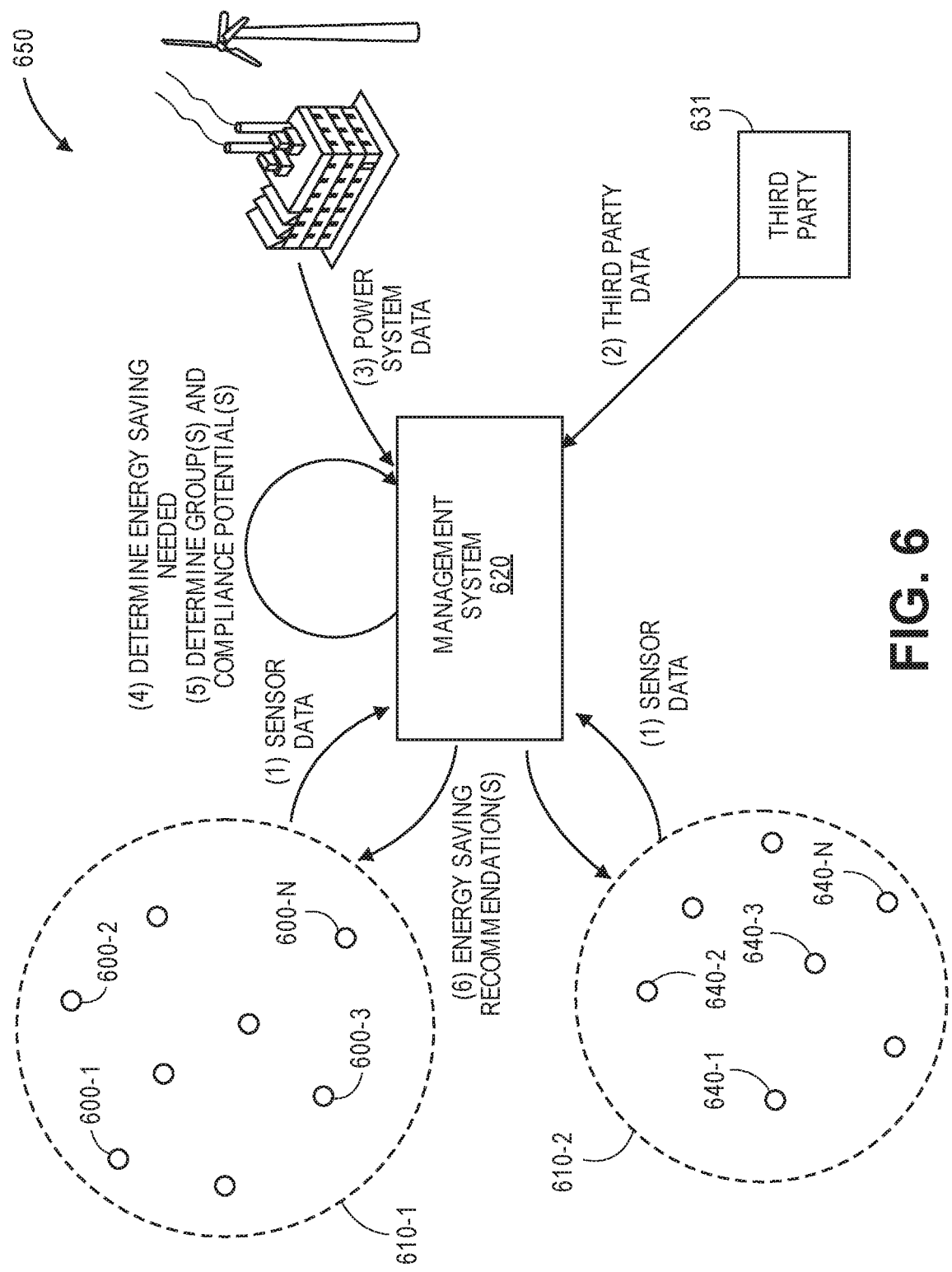
FIG. 6 illustrates an example messaging exchange as part of a group energy saving process, in accordance with described implementations.

FIG. 6 illustrates an example messaging exchange as part of a group energy saving process, in accordance with described implementations. In this example, there are two groups 610-1 and 610-2 and each group includes a plurality of locations 600 and 640, respectively. In other examples, there may be fewer or additional groups and the groups may have different numbers of locations associated therewith. Likewise, some locations that rely on the power system 650 may not be part of a group.

In this example, the first group 610-1 includes locations 600-1, 600-2, 600-3, through 600-N. The second group includes locations 640-1, 640-2, 640-3, through 640-N. A group may have one location or any number of locations. For example, a group may include ten locations, hundreds of locations, or even thousands of locations. The locations of a group may be the same or different types of locations. As discussed below with respect to FIG. 7, group selection may be based on a variety of attributes. For example, a group may include locations that are geographically near one another (e.g., a neighborhood, a community, a city, etc.), locations that have similar types of structures (e.g., residential homes, businesses, apartments, etc.), locations that have similar characteristics (e.g., size, orientation, altitude, building materials, etc.), locations with similar historical energy usage patterns, etc. In other examples, groups of locations may be determined based on user characters of users associated with those locations (e.g., user's willingness to accept energy savings recommendations, schedule when they are typically at the location, etc.). In some implementations, locations included within a group may only be constrained in that the locations are serviced by the same power system 650. As will be appreciated, virtually any configuration of groups may be utilized with the described implementations.

For each location 600/640 of a group 610, sensor data is collected and provided to the management system 620 that is remote from the locations. In addition, third party data, such as weather data, may be received by the management system 620 from one or more third parties 631, and power system data indicating power demand or load on the power system may be received from the power system 650.

The received data may be processed to determine a needed energy savings. For example, if the data received from the power system indicates that the current power demand is being fulfilled by a single power station but the power station is nearing a peak output, the third party data indicates an expected increase in temperature, and the sensor data and/or historical information known about the locations, or other locations, indicate an expected increase in power demand in response to the expected increase in whether, it may be determined by the management system 620 that the expected increase in demand will exceed the capacity of the currently active power station. If it is determined that the expected increase in demand will exceed the capacity of the currently active power station such that an additional power station will need to be activated, or brownouts/blackouts may occur, the management system may determine that an energy savings from one or more of the groups is desirable to avoid an increase in cost resulting from activation of the additional power station.

For example, the management system 620 may determine the amount of energy savings that is needed to avoid activation of the additional power station. Likewise, the management system may determine for each group the energy savings needed from that group individually or in conjunction with other groups to realize the needed energy savings. As another example, the power system data may indicate the current utilization of each active power station and the management system may determine if there is a reasonable energy savings amount that, if accomplished, would result in the ability to shut down one or more of the power stations, thereby reducing the cost of power.

As one example, the management system may determine that if the total demand on the power system is reduced by five-percent, the cost of power will either be maintained (e.g., because the power system will not need to activate another power station) or the cost of power will decrease (e.g., because the power system will be able to shut down or redirect power away from a power station). The management system may further determine the current power demanded by locations of one or more of the groups and determine the amount of energy savings needed (e.g., needed energy savings value) from one or more of those groups to achieve the five-percent total decrease in power demand on the power system. For example, the management system 620 may determine that, alone, locations associated with the first group 610-1 would need to reduce their energy consumption by at least twenty-five percent to realize the total reduction of five percent on the power system 650, because the locations of the first group only consume a percentage of the total energy from the power station. The management system may also determine that the second group, which includes fewer locations than the first group, would need to reduce their energy consumption by at least fifty-percent to realize the five-percent total reduction in power demanded from the power system 650. As still another example, the management system may determine that the total five-percent reduction may be realized if the first group collectively reduces energy consumption by fifteen-percent and the locations of the second group collectively reduce energy consumption by twenty-percent. If there are additional groups and/or locations that provide sensor data to the management system and rely on the power system for power, the management system may determine different combinations of energy savings needed from the different groups and/or individual locations to realize the total needed energy savings.

In addition to determining different energy savings needed from the different groups and/or individual locations, the management system also determines the likelihood of compliance with recommended energy saving actions by each of the groups. For example, the management system may maintain historical information for each location of each group regarding compliance with energy savings recommendations under similar conditions (e.g., similar time of day, similar weather, etc.). Based on the compliance potential of a group and the amount of energy savings needed, it is determined whether the group is likely to comply with the needed energy savings from the group. If the group is likely to comply, recommended energy saving actions may be sent to locations at each group requesting compliance and a reduction in energy consumption. As discussed above, the energy savings actions may be sent as message data and/or command data, may be specific to each location, and different locations of a group may realize different amounts of energy savings. Likewise, some locations of a group may comply and provide energy savings while others may not. If there is not an energy savings amount for a group that will result in the group likely complying and also result in the realization of the necessary energy savings, the energy savings recommendations may not be sent to the locations of the group. Continuing with the above example, the management system may determine that neither the first group 610-1 or the second group 610-2 are likely to comply with the energy savings needed by one of the groups alone (e.g., the twenty-percent needed from the first group alone or the fifty-percent needed from the second group alone) and thus will not provide the energy savings actions recommendations that would be needed to produce those amounts of energy savings from locations of those groups. However, the management system may determine that the first group 610-1 is likely to comply with the fifteen-percent energy reduction and the second group is likely to comply with the twenty-percent reduction in energy reduction. Based on a such a determination, energy saving actions may be sent in the form of message data and/or command data to each location of the first group that will collectively produce, or based on the expected percentage of compliance by the locations 600 of the first group 610, will produce the desired group energy savings amount of fifteen-percent. Likewise, the management system 620 may send message data and/or command data to each location of the second group 610-2 that will collectively produce, or based on the expected percentage of compliance by the locations 640 of the second group 610-2, will produce the desired group energy savings amount of twenty-percent.

In some implementations, incentives may be provided to locations of each group to incent those locations, or users at those locations, to comply with the recommended energy savings actions. In some implementations, the incentives may be dependent on the group realizing the group energy savings. In other implementations, the incentives may be on a location by location basis. In still other implementations, the incentives may be based on the group and other groups or locations all realizing the energy savings needed to reduce the total power demand on the power system by the determined amount. The incentive may be a monetary incentive, and/or other form of incentive.

Figure 7:
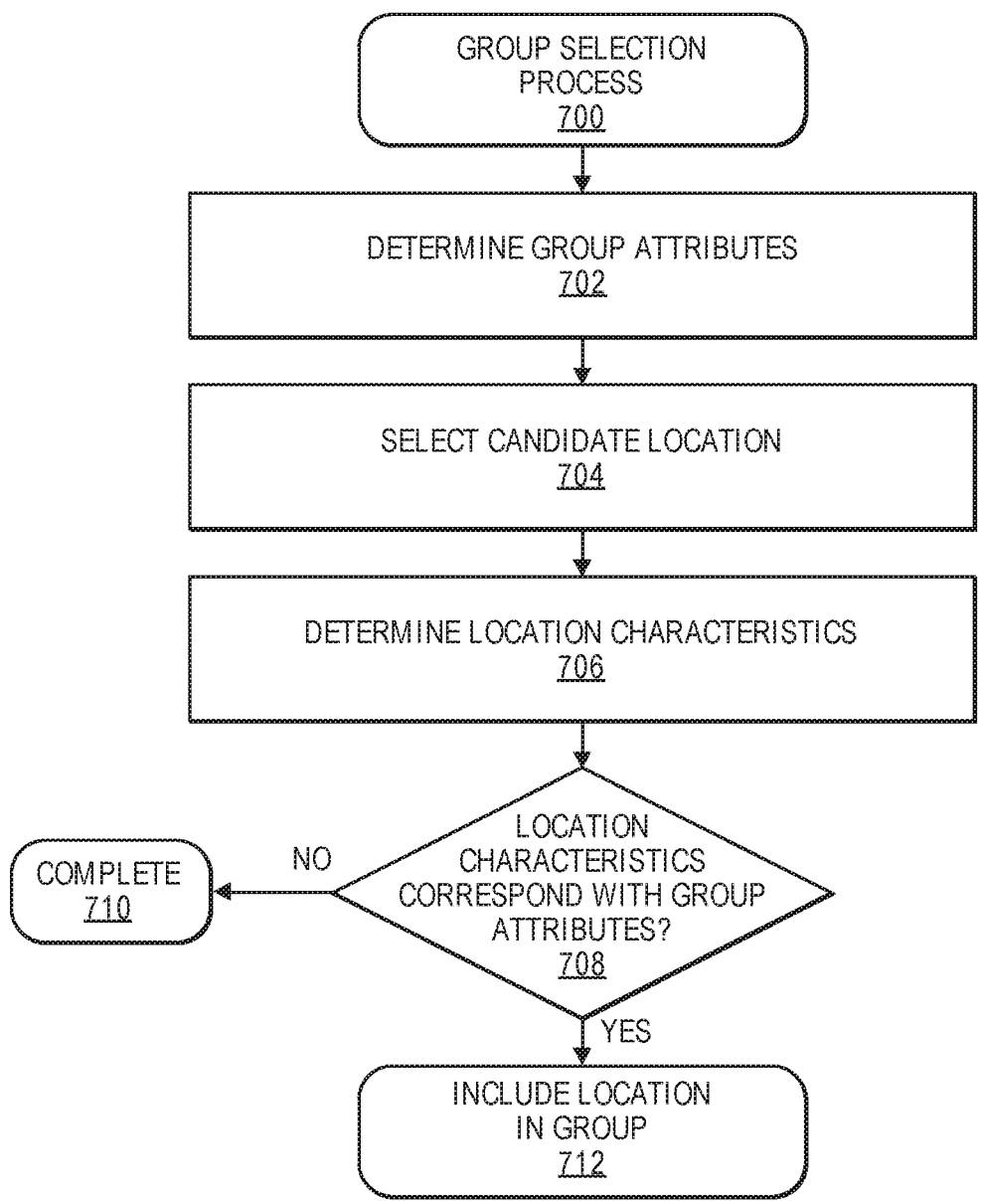
FIG. 7 illustrates an example group selection process, in accordance with described implementations.

FIG. 7 illustrates an example group selection process 700 for selecting locations to include in a group, in accordance with described implementations. The example process 700 begins by determining one or more group attributes for a group, as in 702. Group attributes may be any attribute of a location or a user associated with a location. Attributes may include, but are not limited to, geographic location, type of structure, location characteristics, historical energy usage patterns of the location and/or users associated with the location, user patterns of user associated with the locations (e.g., when the user is typically at the location or away from the location), etc. In some implementations, a location may be included in or associated with a group by the management system. In other implementations, groups may be established and users associated with locations may decide whether to include their location in the group. In such an example, the users may be expected to comply with one or more group commitments. For example, a group may be established that includes locations for which a commitment has been made to comply with a percentage of all energy savings requests, or a commitment to be willing to reduce energy consumption by a defined amount, etc. Such groups may be awarded higher and/or different incentives.

Returning to FIG. 7, a candidate location may then be selected, as in 704, and location characteristics for the location may be determined, as in 706. Location characteristics may be determined based on information provided by a user to the management system, sensor data received from the location, historical information known about the location, and/or information about the location obtained from third parties. For example, a user may indicate the geographic coordinates of the location, the size and/or type of structure at the location, the number, position, and/or types of sensors at the location, etc. If sensor data has been historically received from the location, the historical sensor data may be utilized to determine location characteristics. Third parties may also provide location information. For example, structure information, structure layout/blueprints, etc., may be received from one or more third party locations that maintain such information.

Based on the location characteristics, a determination is made as to whether those location characteristics correspond with the group attributes, as in 708. In some implementations, it may be determined that the location characteristics correspond to the group attributes if a defined percentage (e.g., eighty-five-percent) of the location characteristics match the group attributes. In other implementations, the percentage may be higher or lower. In some implementations, in addition to determining whether the location characteristics correspond with the group attributes, approval by other group members may be desirable before a new location is added to the group. For example, if the group has made a compliance commitment, group acceptance of new locations may be desirable.

If it is determined that the location characteristics do not correspond with the group attributes, the example process 700 completes and the location is not included in the group, as in 710. However, if it is determined that the location characteristics do correspond with the group attributes, the location is included or added to the group, as in 712. The example process may be performed as new locations are added to, join, or become monitored by the management system and/or periodically performed for any locations that are not part of a group of locations.

Figure 8:
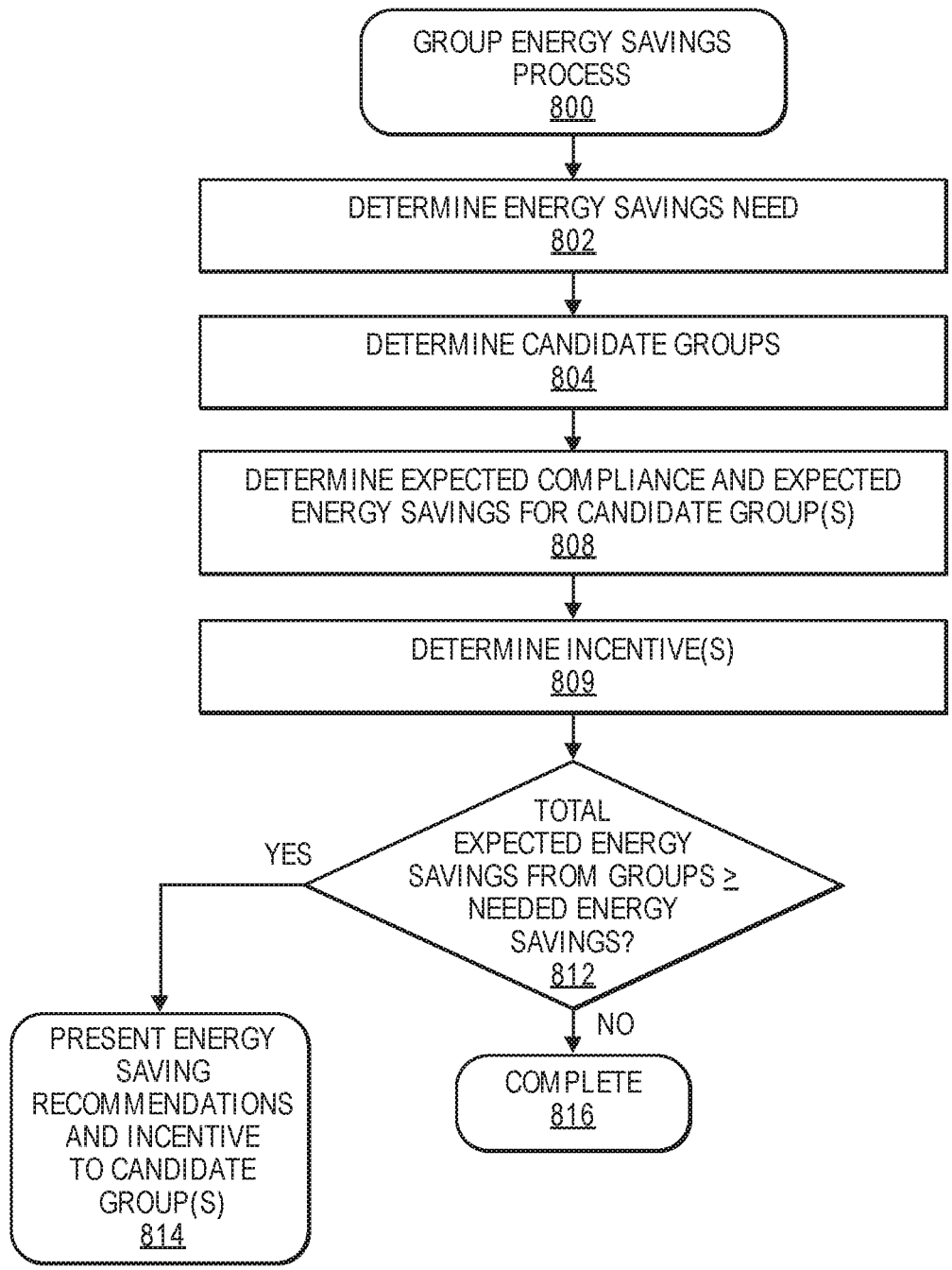
FIG. 8 illustrates an example group energy savings process, in accordance with described implementations.

FIG. 8 illustrates an example group energy savings process 800, in accordance with described implementations. The example process 800 begins by determining an amount of energy savings needed or desired, as in 802. As discussed above, the energy savings needed may be based on, for example, a predicted power demand or load at the power system, an actual or current power demand at the power system, or a combination of both the actual or current power demand and a predicted power demand.

Based on the needed energy savings, one or more candidate groups are selected for consideration, as in 804. In some implementations, all groups that include one or more locations that participate in potential energy savings actions may be considered with the example process 800. In other implementations, only a subset of the groups may be considered.

For each selected candidate group, one or more necessary group compliance and expected energy savings amounts are determined, as in 808. For example, all groups may be considered and a balance or portion of the total energy savings to be achieved may be distributed among the groups based on the expected compliance and expected energy savings such that the total energy savings is predicted to be achieved. In some implementations, the total energy savings may be distributed equally among groups. In other implementations, the likelihood of compliance of each group at different energy savings levels are determined and energy savings levels selected for different groups based on the likelihood of compliance. In such an example, some groups may be expected or requested to provide a larger total and/or by location energy savings than other groups.

In addition to determining the expected compliance and energy savings for the candidate groups, incentives for each group may be determined, as in 809. The incentive may be a monetary and/or other incentive that may be utilized to incent members of the candidate groups to comply with recommended energy saving actions. In some implementations, the incentive may be based on the amount of energy savings each group is requested to provide, based on the number of locations in each group, based on the energy savings actually realized by the group, based on whether the total needed energy savings is achieved, etc. Because some groups may provide a larger energy savings than others, the incentives presented to the different groups may vary. In other implementations, the incentives for each group may be substantially equal.

Finally, a determination is made as to whether the total expected energy savings from the candidate groups, considering their amount or percentage of expected compliance, equals or exceeds the needed energy savings, as in 812. If the total expected energy savings from the groups equals or exceeds the needed energy savings, energy savings actions are determined for each location of the group(s) and presented to each location of the group(s) as recommended energy savings actions, as in 814. The energy savings actions may be determined for each location of a group utilizing any of the described implementations discussed herein. In addition to providing recommended energy savings actions, in some implementations, the determined incentives may also be recommended to locations of the candidate groups, as in 814.

If it is determined that the total expected energy savings from the group(s) does not equal or exceed the needed energy savings, the process completes, as in 816, and the recommended energy saving actions may not be provided to the locations. In other implementations, the recommended energy savings actions may still be provided to the locations. Likewise, the incentive may not be provided to the locations and/or the incentive may be different.

As discussed above, user provided phrases, such as requests or inquiries as to how to reduce energy consumption, acceptances of recommended energy savings actions, etc., may be received and processed by a device, such as the communication component, and/or by the communication services using ASR and NLU. ASR and NLU can be computationally expensive. That is, significant computing resources may be needed to process ASR and NLU processing within a reasonable time frame. Because of this, a distributed computing environment may be used when performing speech processing. A typical such distributed environment may involve a local device, such as the communication component discussed above that may be utilized by a user to request how to reduce energy consumption and/or to receive and output to the user message data indicating the recommended energy saving actions. The communication component may include one or more microphones configured to capture sounds from a user speaking and convert those sounds into an audio signal. The audio signal/data may then be sent to a remote device, such as the management system, for further processing, such as converting the audio signal into an ultimate statement or request.

A user utterance or phrase may include a statement, request, or command. For example, the request may be a simple request such as "How can I reduce my energy consumption?" to more detailed requests, such as "How much energy will I save if I adjust my HVAC by three degrees?" In addition to receiving requests and/or responses to recommended energy saving actions, other user inputs may be received and processed by the communication component discussed herein. Other types of inputs may include queries for information (e.g., "what is the capital of France?") to more detailed questions involving time, place, multiple entities, etc. (for example, "when was Jane Doe married to John Doe?"). Further, inputs may range in specificity and/or complexity, for example, one input may be "turn off the lights in every room except this one" whereas another may be "delay operation of the dishwasher until the power demand goes down." Different queries may thus involve different intents, that is, different utterances may be asking the system to perform different operations. In the examples and implementations discussed above, the user inputs have been related to intents of conserving energy.

As can be appreciated, natural language understanding involves a complex analysis of text (which may be obtained either from a spoken utterance or from some other source) and potentially other data to determine the text's precise meaning. The process of identifying the intent of an utterance (i.e., the ultimate desired result) may be referred to as intent classification. Present NLU query answering systems typically employ a multi-domain architecture wherein each domain represents a certain subject area for a system. Example domains include weather, music, shopping, etc. Each domain is typically configured with its own intents, slot structure, or the like as well as its own logic or other components needed to complete the NLU processing for a particular query. Thus, in order to configure a system to handle a new function, intents, slots and other items used for speech processing need to be specially designed, configured, and tested for each new domain. This leads to significant resource expenditures to train and enable the system to handle additional domains.

Further, during runtime, a speech processing system may process a single utterance using multiple domains at the same time, or otherwise substantially in parallel. As the system may not know ahead of time what domain the utterance belongs in until the speech processing is complete, the system may process text of an utterance substantially simultaneously using models and components for different domains (e.g., books, video, music, energy, weather, etc.). The results of that parallel processing may be ranked, with the highest-ranking results being executed and/or returned to the user, as appropriate.

Figure 9:
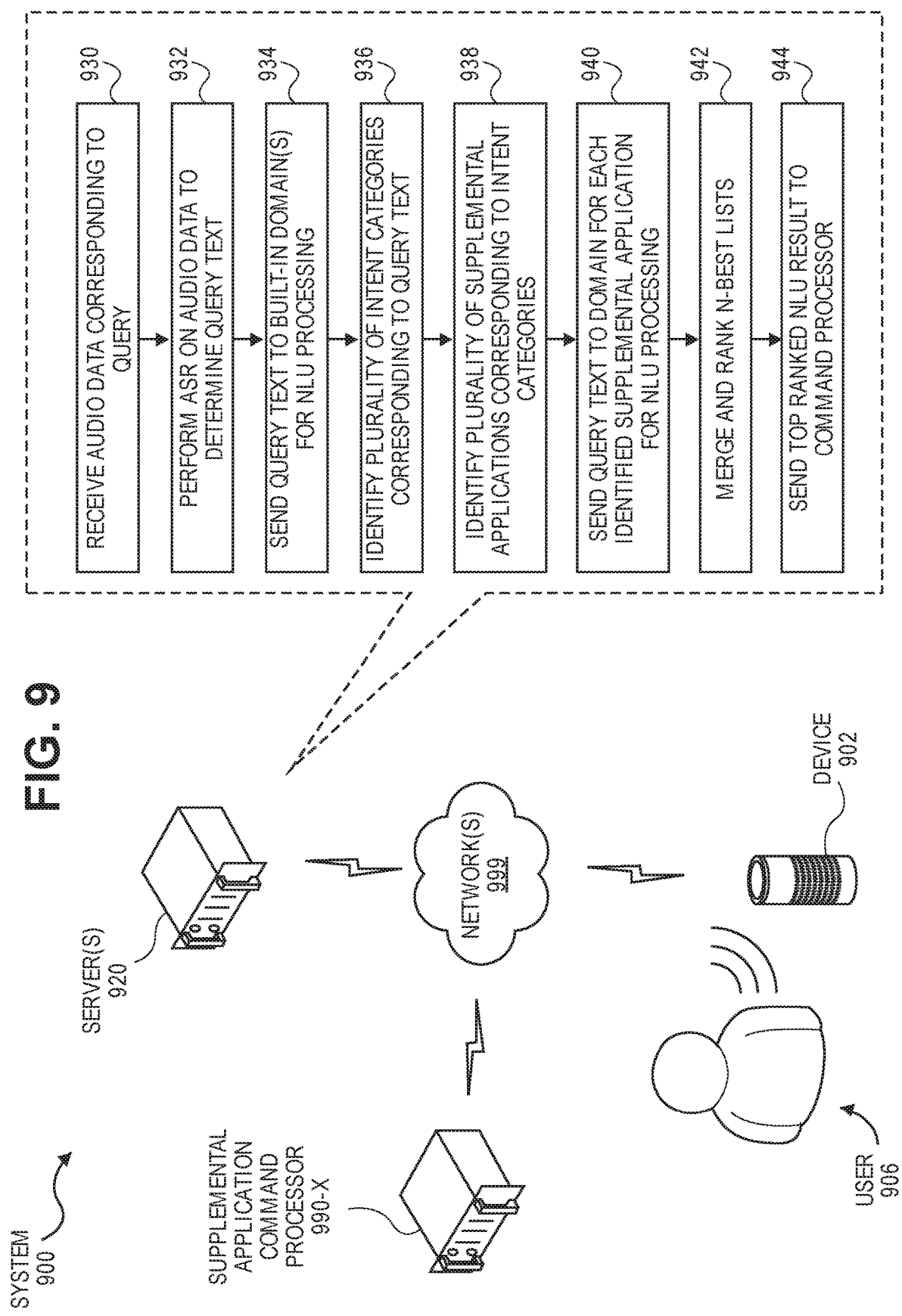
FIG. 9 illustrates a system for establishing a communication session between speech-controlled devices in an automatic speech recognition (ASR) system, in accordance with described implementations.

FIG. 9 shows a system 900 configured to perform NLU processing. A system 900 may include one or more devices 902 local to user(s) 906, as well as one or more networks 999 and one or more servers 920 connected to device 902 across network(s) 999. The server(s) 920 (which may be one or more different physical devices) may be capable of performing traditional speech processing (such as ASR, NLU, query parsing, etc.) as described herein. A single server may be capable of performing all speech processing or multiple server(s) 920 may combine to perform the speech processing. Further, the server(s) 920 may be configured to execute certain commands, such as answering queries spoken by the user 906. In addition, certain speech detection or command execution functions may be performed by the device 902.

As shown in FIG. 9, a system may receive (930) audio data corresponding to a query. The system may then perform (932) ASR on the audio data to determine query text. The system may then send (934) the query text to NLU domains corresponding to built-in functionality of the system 900. Those domains may then perform NLU processing to obtain N-best lists (one for each built-in domain). The system may also identify (936) a plurality of intent categories corresponding to the query text along with scores for how the query text matches each intent category. The system may then identify (938) a plurality of applications corresponding to the intent categories. The applications may correspond to supplemental applications created by third-party developers and added to the system 900 to enhance the system functionality. The system may then send (940) the query text to the NLU domains for each of the identified supplemental applications. Each domain for a supplemental application may then perform NLU processing to obtain N-best lists (one for each identified supplemental domain). The system may then merge and rank (942) the N-best lists resulting from the NLU processing of the built-in domains and domains for the supplemental applications. The system may then send (944) the top ranked result to a command processor 990, which, for a result associated with a supplemental application, may be a supplemental application command processor 990-X, which may be located separately from system 900.

Figure 10:
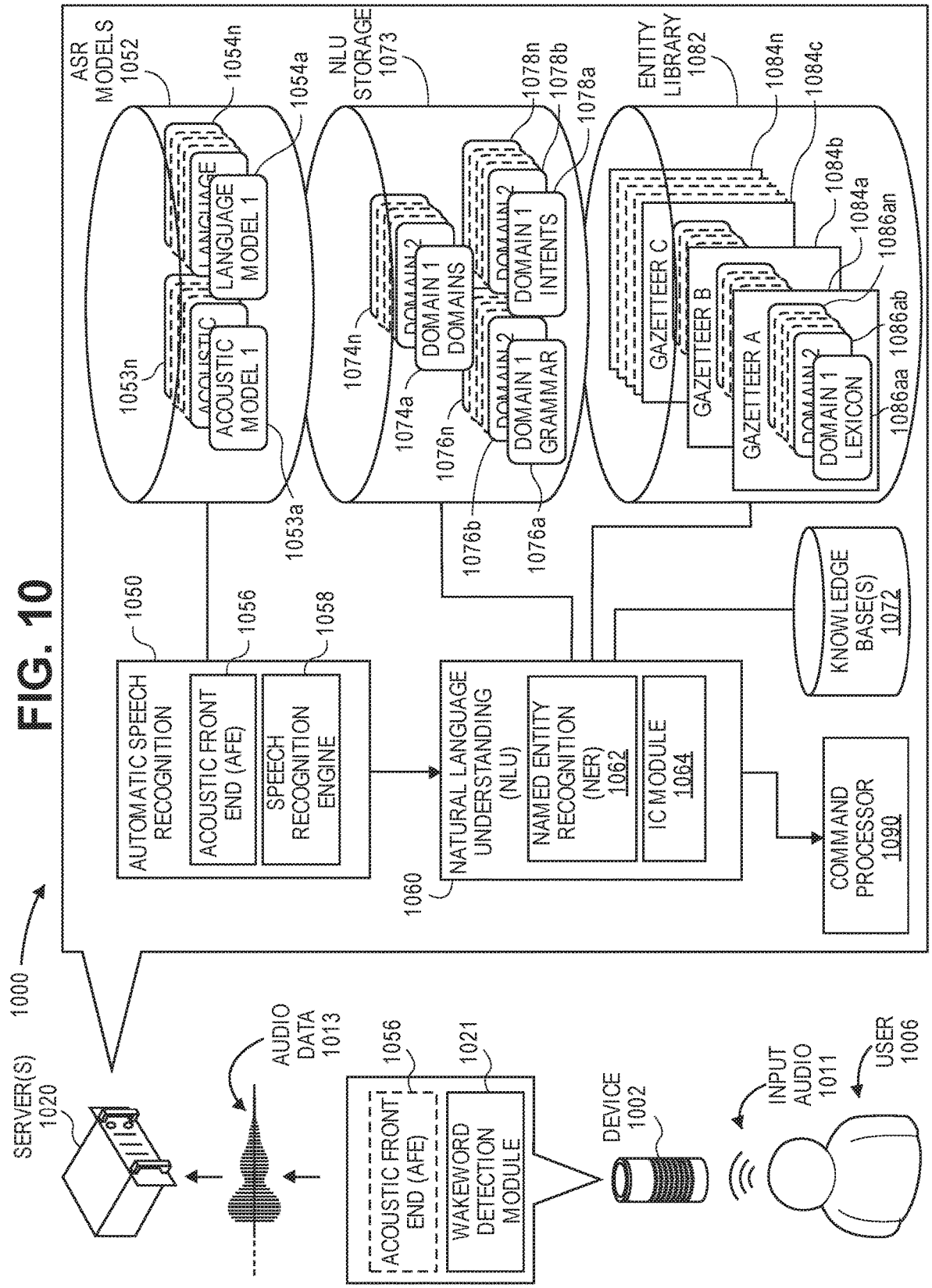
FIG. 10 illustrates example components of a speech processing system, in accordance with described implementations.

FIG. 10 is a conceptual diagram of how a spoken utterance is processed, allowing a system to capture and execute commands spoken by a user, such as spoken commands that may follow a wakeword. The various components illustrated may be located on the same or different physical devices. Communication between various components illustrated in FIG. 10 may occur directly or across a network. An audio capture component, such as a microphone of device 1002, captures audio 1011 corresponding to a spoken utterance from a user 1006. The device 1002, using a wakeword detection module 1021, then processes the audio, or audio data corresponding to the audio, to determine if a keyword (such as a wakeword) is detected in the audio. Following detection of a wakeword, the device sends audio data 1013 corresponding to the utterance, to a server 1020 that includes an ASR module 1050. The audio data 1013 may be output from an acoustic front end (AFE) 1056 located on the device 1002 prior to transmission. Or the audio data 1013 may be in a different form for processing by a remote AFE 1056, such as the AFE 1056 located with the ASR module 1050.

The wakeword detection module 1021 works in conjunction with other components of the device, for example, a microphone to detect keywords in the input audio 1011. For example, the device 1002 may convert input audio 1011 into audio data 1013, and process the audio data with the wakeword detection module 1021 to determine whether speech is detected, and, if so, if the audio data comprising speech matches an audio signature and/or model corresponding to a particular keyword.

The device 1002 may use various techniques to determine whether audio data includes speech. Some implementations may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 1002 may implement a limited classifier configured to distinguish speech from background noise. The classifier may be implemented by techniques such as linear classifiers, support vector machines, and decision trees. In still other implementations, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 1011 received by the device 1002 (or separately from speech detection), the device 1002 may use the wakeword detection module 1021 to perform wakeword detection to determine when a user intends to speak a command to the device 1002. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1021 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signal respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another implementation, the wakeword spotting system may be built on deep neural network (DNN)/ recursive neural network (RNN) structures directly, without HMM involved. Such a system may estimate the posteriors of wakewords with context information, either by stacking frames within a context window for DNN, or using RNN. Following-on, posterior threshold tuning or smoothing is applied for decision making. Other techniques for wakeword detection, such as those known in the art, may also be used.

Once the wakeword is detected, the local device 1002 may "wake" and begin transmitting audio data 1013 corresponding to input audio 1011 to the server(s) 1020 for speech processing. Audio data 1013 corresponding to the input audio 1011 may be sent to a server 1020 for routing to a recipient device or may be sent to the server for speech processing for interpretation of the included speech (e.g., for purposes of enabling communication sessions, for purposes of executing a command in the speech, or for other purposes). The audio data 1013 may include data corresponding to the wakeword, or the portion of the audio data corresponding to the wakeword may be removed by the local device 1002 prior to sending. Further, a local device 1002 may "wake" upon detection of speech/spoken audio above a threshold. Upon receipt by the server(s) 1020, an ASR module 1050 may convert the audio data 1013 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 1054a-1054n stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053a-1053n stored in an ASR Models Storage 1052), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1050 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine. The speech recognition engine 1058 compares the speech recognition data with acoustic models 1053, language models 1054, and other data models and information for recognizing the speech conveyed in the audio data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the device 1002 may process audio data into feature vectors (for example using an on-device AFE 1056) and transmit that information to a server across a network for ASR processing. Feature vectors may arrive at the server encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as energy, music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 1020, for natural language understanding (NLU) processing, such as conversion of the text into commands for execution, either by the device 1002, by the server 1020, or by another device (such as a server running a specific application like a search engine, etc.).

The device performing NLU processing 1060 (e.g., server 1020) may include various components, including potentially dedicated processor(s), memory, storage, etc. As shown in FIG. 10, an NLU component may include a named entity recognition (NER) module 1062 which is used to identify portions of query text that correspond to a named entity that may be recognizable by the system. A downstream process called named entity resolution actually links a text portion to an actual specific entity known to the system. To perform named entity resolution, the system may utilize gazetteer information (1084*a*, 1084*b*, 1084*c*-1084*n*) stored in entity library storage 1082. The gazetteer information may be used for entity resolution, for example matching ASR results with different entities (such as appliances, locations, user names, etc.). Gazetteers may be linked to users and/or locations (for example, a particular gazetteer may be associated with a specific user's preference for energy savings), may be linked to certain domains (such as energy), or may be organized in a variety of other ways.

Generally, the NLU process takes textual input (such as processed from ASR 1050 based on the utterance input audio 1011) and attempts to make a semantic interpretation of the text. That is, the NLU process determines the meaning behind the text based on the individual words and then implements that meaning. NLU processing 1060 interprets a text string to derive an intent or a desired action from the user as well as the pertinent pieces of information in the text that allow a device (e.g., device 1002) or other system, such as the management system, to complete that action. For example, if a spoken utterance is processed using ASR 1050 and outputs the text "Shut off my refrigerator" the NLU process may determine that the user intended to initiate an energy savings by shutting of the refrigerator positioned at the location corresponding to the user.

The NLU may process several textual inputs related to the same utterance. For example, if the ASR 1050 outputs N text segments (as part of an N-best list), the NLU may process all N outputs to obtain NLU results.

The NLU process may be configured to parse and tag or otherwise annotate text as part of NLU processing. For example, for the text "Shut off my refrigerator," "shut off" may be tagged as a command and "refrigerator" may be tagged as a specific entity and target of the command (and a device identifier for a device associated with the entity corresponding to "refrigerator" that is associated with the user or a location associated with the user may be included in the annotated result). Further, the NLU process may be used to provide answer data in response to queries, for example, using the knowledge base 1072.

To correctly perform NLU processing of speech input, an NLU process 1060 may be configured to determine a "domain" of the utterance so as to determine and narrow down which services offered by the endpoint device (e.g., server 1020 or device 1002) may be relevant. For example, an endpoint device or appliance may be controlled to alter an operation of the appliance.

The named entity recognition (NER) module 1062 receives a query in the form of ASR results and attempts to identify relevant grammars and lexical information that may be used to construe meaning. To do so, the NER module 1062 may begin by identifying potential domains that may relate to the received query. The NLU storage 1073 includes a database of appliances (1074*a*-1074*n*) identifying domains associated with specific appliances. For example, the appliance 1002 may be associated with domains for energy conservation, music, communication sessions, calendaring, contact lists, and device-specific communications, but not video. In addition, the entity library may include database entries about specific services on a specific appliance, either indexed by Device ID, User ID, or Household ID, or some other indicator.

In NLU processing, a domain may represent a discrete set of activities having a common theme, such as "energy," "communication session," "shopping," "music," "calendaring," etc. As such, each domain may be associated with a particular language model and/or grammar database (1076*a*, 1076*b*-1076*n*), a particular set of intents/actions (1078*a*, 1078*b*-1078*n*), and a particular personalized lexicon (1086). Each gazetteer (1084*a*-1084*n*) may include domain-indexed lexical information associated with a particular user and/or device. For example, the Gazetteer A (1084*a*) includes domain-index lexical information 1086*aa*, 1086*ab*-1086*an*. A user's music-domain lexical information might include album titles, artist names, and song names, for example, whereas a user's energy-domain lexical information might include the names of appliances, sensor locations, energy saving action types, etc. Since every user's music collection and energy preferences is presumably different, this personalized information improves entity resolution.

As noted above, in traditional NLU processing, a query may be processed applying the rules, models, and information applicable to each identified domain. For example, if a query potentially implicates both energy and music, the query may, substantially in parallel, be NLU processed using the grammar models and lexical information for energy, and will be processed using the grammar models and lexical information for music. The responses based on the query produced by each set of models is scored, with the overall highest ranked result from all applied domains ordinarily selected to be the correct result.

An intent classification (IC) module 1064 parses the query to determine an intent or intents for each identified domain, wherein the intent corresponds to the action to be performed that is responsive to the query. Each domain is associated with a particular set of intents/actions (1078*a*-1078*n*) of words linked to intents. For example, a music intent may link words and phrases such as "quiet," "volume off," and "mute" to a "mute" intent. An energy intent may link words and phrases such as "savings" and "reduce" to an "energy consumption" intent. The IC module 1064 identifies potential intents for each identified domain by comparing words in the query to the words and phrases in the set of intents actions 1078 for that domain. Traditionally, the determination of an intent by the IC module is performed using a set of rules or templates that are processed against the incoming text to identify a matching intent.

In order to generate a particular interpreted response, the NER 1062 applies the grammar models and lexical information associated with the respective domain to actually recognize and mention one or more entities in the text of the query. In this manner, the NER 1062 identifies "slots" (i.e., particular words in query text) that may be needed for later command processing. Depending on the complexity of the NER 1062, it may also label each slot with a type of varying levels of specificity (such as noun, place, city, artist name, song name, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the energy domain may include a database of words commonly used when people discuss power or energy.

The intents identified by the IC module 1064 are linked to domain-specific grammar frameworks (included in 1076) with "slots" or "fields" to be filled. Each slot/field corresponds to a portion of the query text that the system believes corresponds to an entity. For example, if "shut off my refrigerator" is an identified intent, a grammar (1076) framework or frameworks may correspond to sentence structures such as "Disable power to the device {Appliance Name}," etc. However, to make resolution more flexible, these frameworks would ordinarily not be structured as sentences, but rather based on associating slots with grammatical tags.

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for an intent of "shut off" may specify a list of slots/fields applicable to perform the action with respect to an identified "object" and any object modifier (e.g., a prepositional phrase), such as {Object Name}, {Appliance Identifier}, etc. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazetteer for similarity with the framework slots. For example, a framework for "shut off" intent might indicate to attempt to resolve the identified object based {Appliance Name} or {Device Identifier} and another framework for the same intent might indicate to attempt to resolve the object modifier based on {Constraint}. If the search of the gazetteer does not resolve a slot/field using gazetteer information, the NER module 1062 may search the database of generic words associated with the domain (in the knowledge base 1072). So, for instance, if the query was "Shut off a device to save energy," after failing to determine a device identifier of "a device," the NER component 1062 may search the domain vocabulary or check generic words before the gazetteer information, or both may be tried, potentially producing two different results.

The output from the NLU processing (which may include tagged text, commands, etc.) may then be sent to a command processor 1090, which may be located on a same or separate server 1020 as part of system 1000. The destination command processor 1090 may be determined based on the NLU output. For example, if the NLU output includes a command to shut off a device, a request to conserve energy, an energy saving action, or the like, the destination command processor 1090 may be the management system discussed herein and/or server 1120 discussed further below with respect to FIG. 11.

Figure 11:
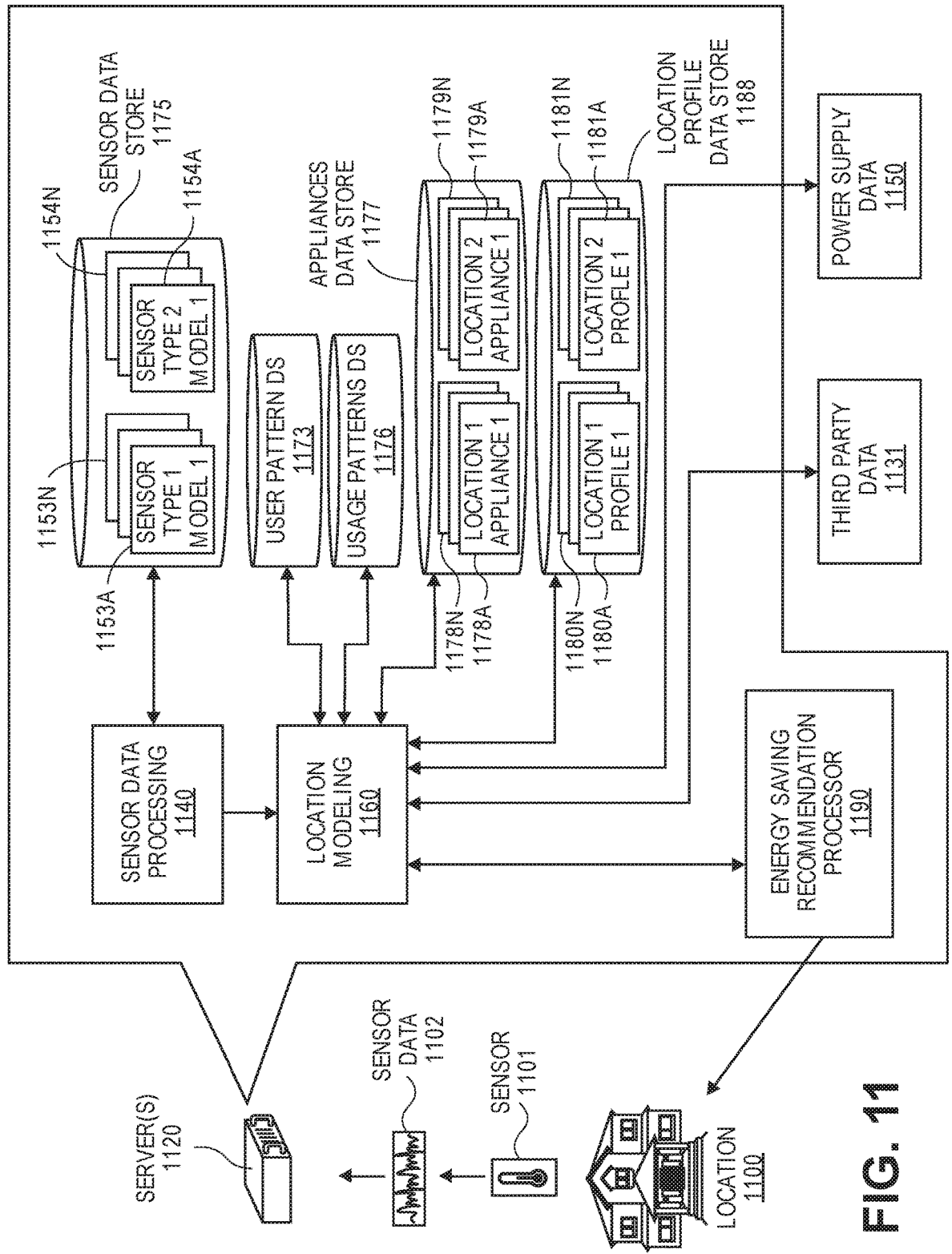
FIG. 11 illustrates example components of a management system, in accordance with described implementations.

FIG. 11 is a conceptual diagram of a server 1120 that processes and stores sensor data from a location 1100, third party data from a third party 1131, power supply data 1150, and provides command data and/or message data, in accordance with described implementations. The various components of the server 1120 may be located on the same or different physical devices. Communication between various components illustrated in FIG. 11 may occur directly or across a network. The server 1120 discussed with respect to this FIG. 11 may be the same or a different server than the server 1020 discussed above with respect to FIG. 10. In operation, the server 1120 may include computer-readable and computer-executable instructions that reside on the server 1120 and perform one or more of the described features or functions, also referred to herein as a management system.

As discussed above, the energy savings recommendation processor 1190 may function as the command processor 1090 (FIG. 10) for energy savings actions and receive output from the NLU of the server 1020 (FIG. 10). The output may include, for example, tagged text, commands, indications of appliances, energy savings request, etc. Likewise, as discussed further below, upon determining one or more energy savings actions to be performed at a location, the energy savings recommendation processor 1190 may generate and send command data and/or message data to a communication component, communication hub, and/or appliances at the location 1100 for presentation to a user at the location and/or for programmatic execution by the appliance(s) at the location 1100.

Sensor data 1102 from one or more sensors 1101 at a location 1100 is transmitted in real time, near real time, or periodically to one or more remote computing resources, illustrated in this example as a server 1120. The server receives and processes the sensor data with sensor data processing 1140. Processing may include determining a sensor type from the sensor data store 1175 that corresponds with the received sensor data 1102 and/or comparing the sensor data to stored sensor data from the same or different sensors at the location and/or comparing the sensor data to sensor data of other similar locations to determine differences between the stored sensor data and the received sensor data 1102. The sensor data store 1175 may maintain sensor type information and/or sensor models for different sensors at the same or different locations. For example, a sensor of sensor type 1 may include multiple different sensor models 1153A-1153N corresponding to sensor data received from different locations and/or manufacturer specifications corresponding to sensors of that type. Likewise, a sensor of sensor type 2 may include multiple different sensor models 1154A-1154N corresponding to sensor data received from different locations and/or specifications corresponding to sensors of that type.

In some implementations, rather than sensor data being sent from the location 1100 to the servers 1120, a communication hub at the location may process the sensor data to detect one or more events in the sensor data. The communication hub may then send an event identifier representative of the event to the servers 1120 for additional processing. For purposes of the explanation provided with respect to FIG. 11, sensor data is utilized. However, it will be appreciated that the same implementations described with respect to FIG. 11, and elsewhere herein, may likewise utilize event indicators determined by communication hubs at various locations.

As the sensor data is collected, it may be aggregated with other sensor data from the location that corresponds to a similar point in time as the sensor data to develop a location profile 1180 using a location modeling component 1160. The location profile 1180 may include current sensor data received from sensors at the location 1100 and/or sensor data received from other sensors at other, similar locations. For example, if historical location profile models have been developed for the location 1100 and stored in the location profile data store 1188, the historical location models may be compared with other historical location models to identify locations with similar characteristics, behaviors, and/or conditions. Over time, multiple location profiles may be created for each location and maintained in the location profile data store 1188. For example, location 1 may include multiple location profiles 1180A-1180N generated at different points in time for that location. Likewise, location 2 may include multiple location profiles 1181A-1181N generated at different points in time for that location. Every location may include one or more location profiles that are stored in the location profile data store 1188.

Location profiles 1180 for different locations may be compared and/or additional sensor data from similar locations may be used to supplement a location profile of a different location. For example, upon identification of similar locations, sensor data from sensors available at those similar locations may be used as additional inputs in establishing the current location profile for the location 1100. For example, if the current location only has internal temperature sensors and external temperature sensors, and a second location that is determined to be similar includes internal temperatures sensors, external temperature sensors, and humidity sensors, upon a determination that the two locations are similar, the humidity sensor data from the second location and maintained in the second location profile 1181 may be used to supplement the temperature sensor data at the current location 1100 to generate a current location profile for that location 1100. As location profiles are determined, the profiles are stored in the location profile data store 1188 and associated with the location 1100.

As sensor data is received, processed and stored, the sensor data provides correlations between different environmental conditions external to a structure at the location 1100 compared to conditions internal to the structure and further based on the energy usage of different appliances at the location. For example, one location profile may indicate the power demand of the location when no energy saving actions are activated and the HVAC is set to twenty degrees Celsius on a sunny day when the external temperature is thirty-two degrees Celsius. Likewise, a second profile for the location may indicate the power demand of the location 1100 under similar environmental conditions when a power saving action of altering the setting of the HVAC to twenty-five degrees Celsius. Based on these two profiles, an expected energy savings can be determined for those conditions based on the demand difference. As additional location profiles are established, the accuracy of determining expected energy savings is increased.

In some implementations, in addition to determining energy saving actions and expected energy savings, the location profiles may be used to determine efficiency losses of an appliance or problems (e.g., mechanical or electrical) with the appliance. For example, if a first location profile under first conditions at a first time indicates a first power demand for the location and second location profile under the same or similar first conditions at a second, later time indicates a second power demand that is higher than the first power demand, such a difference may be indicative of problems with one or more appliances at the location.

In some implementations, sensor data may likewise be used to determine user profiles and/or usage patterns corresponding to the location 1100. For example, sensor data from a camera sensor, motion sensor, pressure sensor, etc., may be used to determine the presence or absence of users at the location and/or at particular areas within the location. As users typically follow a patterned behavior, over time, the sensor information may be used to determine those user patterns and such information may be stored in the user pattern data store 1173. For example, sensor data from a motion sensor may be aggregated over a period of time (e.g., thirty days) to determine that on Monday, Tuesday, Wednesday, Thursday, and Friday, a user at the location generally enters the kitchen within the structure between 05:00 hours and 05:30 hours, moves to a second room between 06:30 hours and 07:30 hours and then departs the location until approximately 18:00 hours. Such information may be maintained in the user profile for the user.

Likewise, other sensor data may also be used to determine usage patterns for appliances at the location. Continuing with the above example, sensor data from various appliances may be used to determine that the kitchen stove (appliance) is used on Monday-Friday between 05:00 hours and 05:30 hours and that the hot water tank is most active between 06:30 hours and 07:30 hours. Usage patterns for appliances may be stored in the usage pattern data store 1176.

In some implementations, an appliance data store 1177 may also be maintained. The appliance data store may include information regarding appliances at each location. For example, the appliance data store may maintain appliance information 1178A-1178N for each of multiple different appliances at a first location, maintain appliance information 1179A-1179N for each of multiple different appliances at a second location, etc.

Appliance information may include, among other information, the manufacturer of the appliance, the make, model, and year of manufacture, the power rating of the appliance, the efficiency of the appliance, etc. In some implementations, data received from a same type of appliance operating at different locations may be compared to determine consistency among appliances and/or to detect potential appliance problems or abnormalities. For example, if there are fifty microwaves of Brand A and forty-nine of them have similar power demands but the fiftieth one has a higher power demand, it may be determined that the fiftieth microwave is potentially malfunctioning.

In response to receiving input from the server 1020 (FIG. 10), for example from the NLU 1060, or when it is otherwise determined that one or more energy saving actions or recommendations are to be determined for a location, the location modeling component 1160 obtains current sensor data, third party data 1131, such as weather data at the location, power system data 1150, location profile and/or user profile data and utilizes that information to determine one or more energy saving actions for the location. For example, one or more modeling algorithms may receive the various inputs and determine one or more energy saving actions for a relevant period of time that will produce the highest energy savings from the location with the least inconvenience or negative impact on the user. For example, if the energy saving action is to be performed on a Saturday between 12:00 hours and 14:00 hours it may be determined that the most effective energy saving action may be to shut off the hot water heater during that time. Such an action may substantially reduce the power demand from the location and be of limited interference to the user at the location because the location profile, user profile, and/or usage patterns indicate that hot water from the hot water tank is rarely used during that time period.

Upon determining by the location modeling component 1160 one or more energy saving actions, the energy savings recommendation processor 1190 may generate command data that includes instructions that cause one or more appliances to programmatically alter operation in accordance with the energy savings action and/or generate message data that includes a recommendation that is output to a user at the location to recommend that the user manually alter an operation of one or more appliances at the location in accordance with the energy saving actions. The command data and/or message data may then be sent to a communication component, communication hub, and/or directly to appliances at the location 1100, as discussed above.

Figure 12:
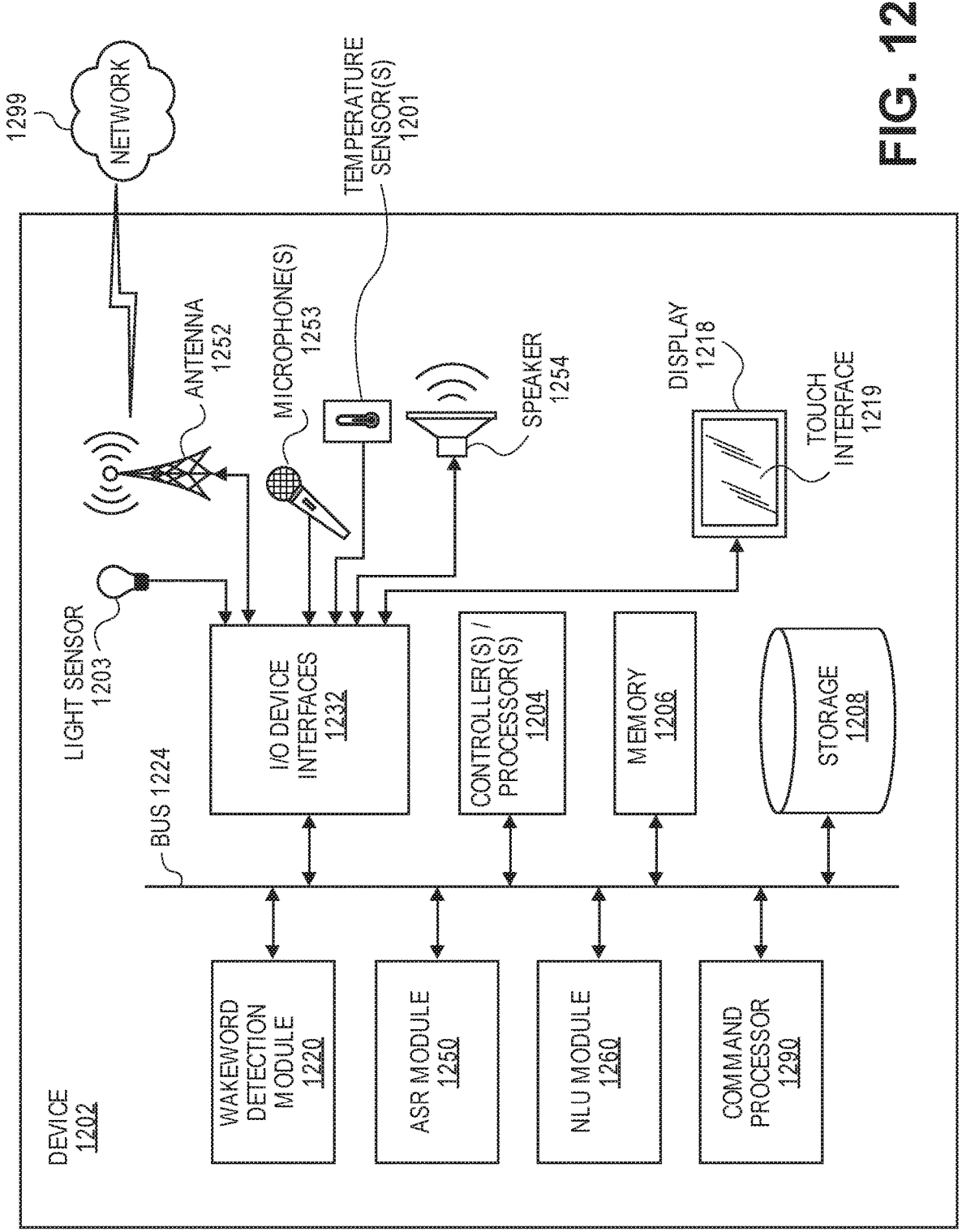
FIG. 12 illustrates example components of a speech-controlled device, in accordance with described implementations.
Figure 13:
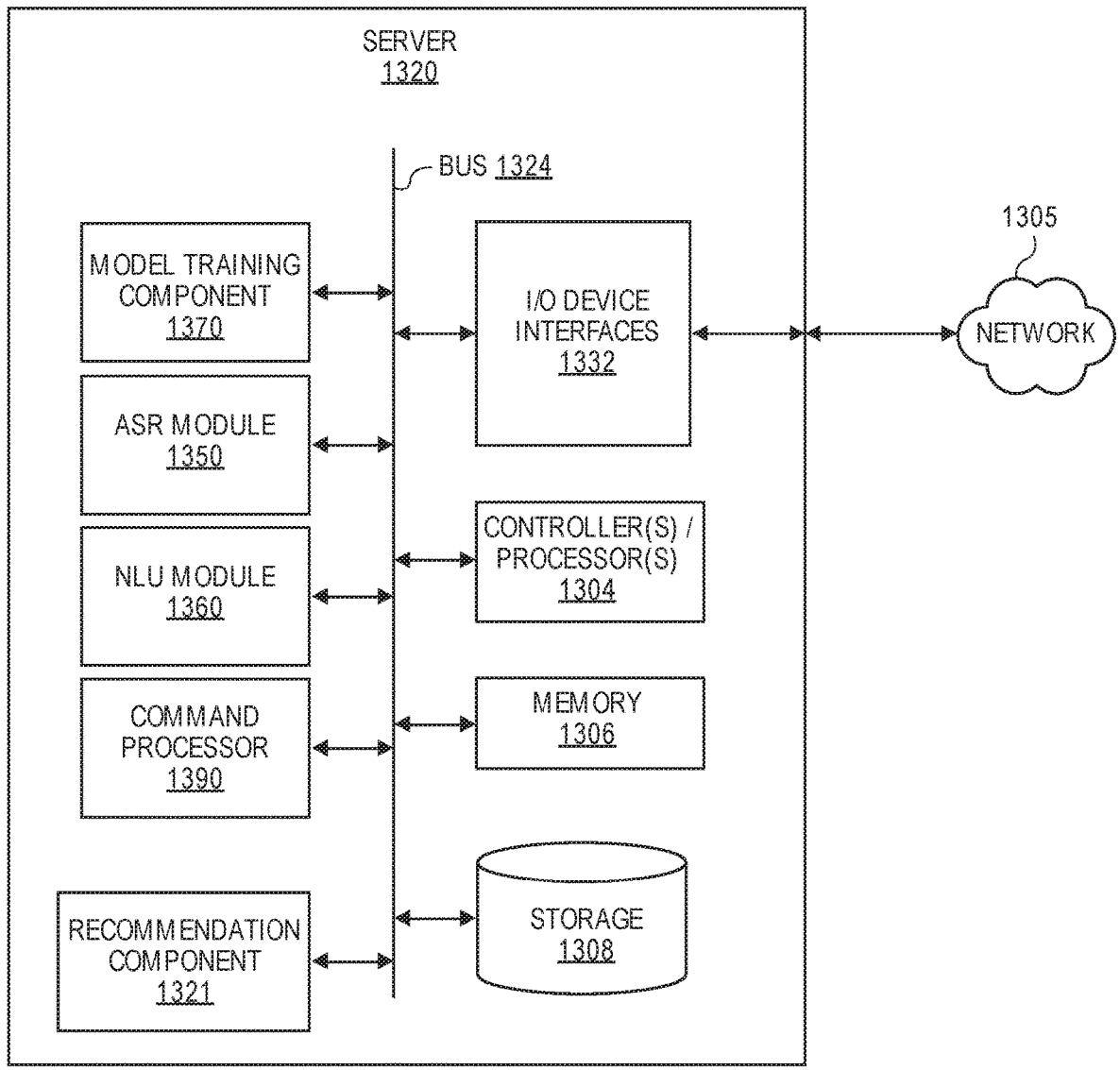
FIG. 13 illustrates example components of a server, in accordance with described implementations.

FIG. 12 is a block diagram conceptually illustrating a local device 1202 that may be used with the described system and referred to in some instances above as a communication component and/or communication hub. FIG. 13 is a block diagram conceptually illustrating example components of a remote device, such as a remote server 1320 that may assist with ASR, NLU processing, or command processing. Multiple such servers 1320 may be included in the system, such as one server(s) 1320 for training ASR models, one server(s) for performing ASR, one server(s) 1320 for performing NLU, etc. In operation, each of these devices (or groups of devices) may include computer-readable and computer-executable instructions that reside on the respective device (1202/1320), as will be discussed further below.

Each of these devices (1202/1320) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1232/1332).

Computer instructions for operating each device (1202/1320) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (1202/1320) includes input/output device interfaces (1232/1332). A variety of components may be connected through the input/output device interfaces, as will be discussed further below. Additionally, each device (1202/1320) may include an address/data bus (1224/1324) for conveying data among components of the respective device. Each component within a device (1202/1320) may also be directly connected to other components in addition to (or instead of) being connected to other components across the bus (1224/1324).

Referring to the device 1202 of FIG. 12, the device 1202 may include a display 1218, which may comprise a touch interface 1219. Alternatively, the device 1202 may be "headless" and may primarily rely on spoken commands for input. As a way of indicating to a user that a connection between another device has been opened, an energy saving action has been activated, etc., the device 1202 may be configured with a visual indicator, such as an LED or similar illumination element, that may change color, flash, or otherwise provide visual indications by the device 1202. The device 1202 may also include input/output device interfaces 1232 that connect to a variety of components such as an audio output component such as a speaker 1254, a wired headset or a wireless headset, and/or other components capable of outputting audio. The device 1202 may also include an audio capture component. The audio capture component may be, for example, a microphone 1253 or array of microphones, a wired headset or a wireless headset, etc. The microphone 1253 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 1202 (using microphone 1253, wakeword detection module 1220, ASR module 1250, etc.) may be configured to determine audio data corresponding to detected audio data. In addition, the device may be configured to communicate with and receive sensor data from other sensors and/or appliances in communication with the device 1202. For example, the device 1202 (using input/output device interfaces 1232, antenna 1252, etc.) may wirelessly communicate with and receive sensor data from other sensors and/or provide instructions to appliances within the location and/or receive data from the appliances. Any form of wired and/or wireless communication may be utilized to facilitate communication between the device 1202, sensors and/or appliances. For example, any one or more of 802.15.4 (ZIGBEE), 802.11 (WI-FI), 802.16 (WiMAX), BLUETOOTH, Z-WAVE, near field communication ("NFC"), etc., may be used to communicate between the device 1202 and one or more sensors and/or appliances.

Likewise, the device 1202 may also be configured to transmit received audio data and/or sensor data to server 1320 for further processing or to process the data using internal components such as a wakeword detection module 1220. For example, via the antenna(s), the input/output device interfaces 1232 may connect to one or more networks 1299/1305 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported. Through the network(s) 1299/1305, the speech processing system may be distributed across a networked environment.

The device 1202 may also include other sensors that collect sensor data that is transmitted to the server 1320. Any number and/type of sensor may be included in the device. In the illustrated example, in addition to the microphone, the device 1202 includes a light sensor 1203 and a temperature sensor 1201. Other sensors may likewise be included in the device 1202.

The device 1202 and/or server 1320 may include an ASR module (1250/1350). The ASR module 1250 in device 1202 may be of limited or extended capabilities or may not be included in the device 1202. The ASR module(s) may include the language models stored in the ASR model storage component, and perform the automatic speech recognition process. If limited speech recognition is included on the device 1202, the ASR module 1250 may be configured to identify a limited number of words, such as keywords detected by the device, whereas extended speech recognition may be configured to recognize a much larger range of words.

The device 1202 and/or server 1320 may include a limited or extended NLU module (1260/1360). The NLU module in device 1202 may be of limited or extended capabilities, or may not be included on the device 1202. The NLU module(s) may comprise the name entity recognition module, the intent classification module and/or other components, as discussed above. The NLU module(s) may also include a stored knowledge base and/or entity library, or those storages may be separately located.

The device 1202 and/or server 1320 may also include a command processor (1290/1390) that is configured to execute commands/functions associated with a spoken command as described above and/or transmit instructions to controlled appliances.

The device 1202 may include a wakeword detection module 1220, which may be a separate component or may be included in an ASR module 1250. The wakeword detection module 1220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 1202 may be configured collectively to identify a set of the directional audio signals in which the wake expression is detected or in which the wake expression is likely to have occurred.

The wakeword detection module 1220 receives captured audio and processes the audio to determine whether the audio corresponds to particular keywords recognizable by the device 1202 and/or system. The storage 1208 may store data relating to keywords and functions to enable the wakeword detection module 1220 to perform the algorithms and methods described above. The locally stored speech models may be pre-configured based on known information, prior to the device 1202 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 1202 prior to the user device 1202 being delivered to the user or configured to access the network by the user. The wakeword detection module 1220 may access the storage 1208 and compare the captured audio to the stored models and audio sequences using audio comparison, pattern recognition, keyword spotting, audio signature, and/or other audio processing techniques.

The server may include a model training component 1370. The model training component may be used to train the classifier(s)/models discussed above. For example, the model training component may receive sensor data, speech input etc., and utilize one or more of the discuss techniques to train the different models maintained by the system.

As noted above, multiple devices may be employed in a single processing system. In such a multi-device system, each of the devices may include different components for performing different aspects of the processing. The multiple devices and/or appliances may include overlapping components and/or be controlled by the same controller, such as the controller discussed below with respect to FIG. 14. The components of the devices 1202 and server 1320, as illustrated in FIGS. 12 and 13, are exemplary, and may be located as a stand-alone device or may be included, in whole or in part, as a component of a larger device or system.

Figure 14:
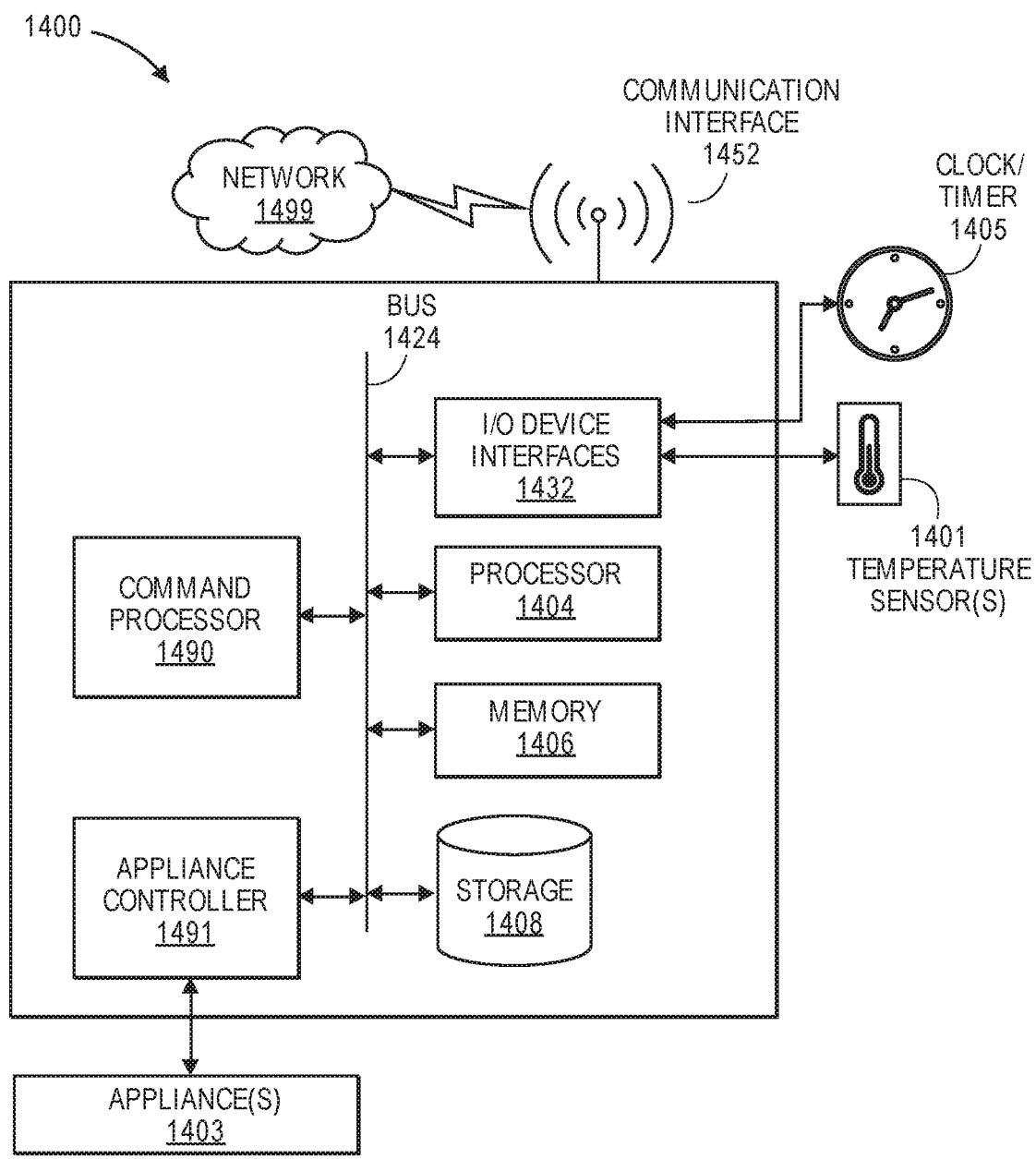
FIG. 14 illustrates example components of a controller that may be used to programmatically alter operation of one or more appliances, in accordance with described implementations.

FIG. 14 illustrates example components of a controller 1400 that may be connected to, and programmatically alter operation of, one or more appliances 1403, in accordance with described implementations. The controller 1400 may be utilized as the communication controller and/or communication hub, as discussed above. Alternatively, or in addition thereto, the controller may be a dedicated device that is operable to control one or more appliances at a location or within a structure. For example, the controller 1400 may be configured to programmatically alter operation of one or more appliances, such as an HVAC, in response to command data received from server 1120 (FIG. 11). As can be appreciated, multiple such controllers 1400 may be included in the system, such as one controller 1400 for each appliance within a location. In operation, each controller 1400 may include computer-readable and computer-executable instructions that reside on the controller 1400, as discussed below.

The controller 1400 may include one or more processors 1404, that may each include a CPU for processing data and computer-readable instructions, such as received command data, and a memory 1406 for storing command data, operating instructions, and the like. The memory 1406 may include volatile RAM, non-volatile ROM, non-volatile MRAM and/or other types of memory. The controller 1400 may also include a data storage component 1408, for storing data and executable instructions, such as instructions included in command data that are to be executed at a future point in time, upon the occurrence of an event, and/or upon satisfaction of a condition. The data storage component 1408 may include one or more non-volatile storage types such as magnetic storage, optical storage, solid-state storage, etc. The controller 1400 may also be connected to removable or external non-volatile memory and/or storage (such as a removable memory card, memory key drive, networked storage, etc.) through an input/output device interface 1432.

The controller 1400 also includes a communication interface 1452, which may be wired and/or wireless to enable communication with a network 1499. As discussed above, any form of communication interfaces may be utilized to connect the controller 1400 with the network 1499. For example, the communication interface 1452 may include an antenna that connects to the network 1499 via a WLAN (such as Wi-Fi) radio, BLUETOOTH, and/or wireless network radio, such as a radio capable of communication with a wireless communication network such as an LTE network, WiMAX network, 3G network, etc. A wired connection such as Ethernet may also be supported.

The controller 1400 may receive, via the network 1499, command data from the server 1220 (FIG. 12) that includes instructions for programmatically altering operation of the attached appliance 1403 that is controlled by the controller 1400. The command data may then be executed by the command processor 1490 to determine the alteration that is to occur for the attached appliance 1403. For example, if the command data indicates that the attached appliance is to operate at 50% capacity, the command processor 1490 may process the command data and determine the alterations to be made with respect to the appliance to programmatically alter operation of the appliance 1403. In some implementations, appliance profile information may be maintained in the storage 1408 and accessed by the command processor 1490 to determine the alteration to be performed with respect to the appliance to execute the instructions included in the command data.

As discussed above, in some implementations, received command data may include an indicator or other information indicating a future point in time, an event that is to occur, or a condition to be satisfied before the energy saving action of programmatically altering operation of the attached appliance 1403 is to occur. In such an instance, the command data may be maintained in memory 1406 and/or placed in storage 1408. Likewise, the command processor 1490 may monitor the attached sensors, such as the temperature sensor 1401 and/or other devices, such as the clock/timer 1405, to determine when the future point in time, event, or condition are satisfied. Upon receiving data from the attached sensors 1401 and/or other devices and determining that the future point in time, event, or condition has been satisfied, the command processor 1490 may execute the instructions included in the received command data and cause the appliance controller 1491 to alter operation of the attached appliances(s) 1403.

The appliance controller 1491 may interface directly with a controller, motor, or other component of the attached appliance(s) 1403 and/or be configured to provide instructions directly to a controller of the attached appliance(s) 1403 to cause an altered operation of the attached appliance(s) 1403. In other implementations, the appliance controller 1491 may include a mechanical switch or circuit that can be adjusted, activated, deactivated, etc., to alter the amount of power provided to the attached appliance(s) 1403, thereby controlling operation of the appliance 1403.

Command data for controlling an attached appliance 1403 and/or other instructions for operating the controller 1400 may be executed by the processor 1404 and/or command processor 1490, using the memory 1406 as temporary "working" storage at runtime. The controller's 1400 computer instructions may be stored in a non-transitory manner in non-volatile memory 1406, storage 1408, or on external device(s). Alternatively, some or all of the executable instructions may be embedded in hardware or firmware on the controller 1400 in addition to or instead of software. Additionally, the controller 1400 may include an address/data bus 1424 for conveying data among components of the controller 1400.

The input/output device interface 1432 may be coupled between the bus 1424 and the various attached devices, such as sensor(s) 1401 and/or clock/timer 1405, to facilitate exchange of data between the attached devices and the controller 1400. A variety of devices may be connected through the input/output device interface 1432, and the example of a temperature sensor 1401 and clock/timer 1405 should not be considered limiting. Likewise, the input/output device interface 1432 may provide a wired and/or wireless interface with the attached devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between the controller 1400 and the one or more devices attached to the I/O interface 1432 of the controller. A wired connection may also be supported.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An energy management system, comprising:
   one or more processors; and
   memory coupled to the one or more processors and storing program instructions that when executed by the one or more processors cause the one or more processors to at least:
   determine a group that includes a plurality of locations;
   determine a threshold for the group to achieve an energy savings from the group;
   determine a value associated with the group, the value indicative of a likelihood that the group will comply with an energy savings request;
   determine that the value satisfies the threshold; and
   in response to a determination that the value satisfies the threshold, send, to a first location of the plurality of locations, at least one of:
      message data indicating a first appliance at the first location whose operation is to be altered by a user to reduce energy consumption at the first location; or command data to cause programmatic altering of operation of a second appliance to reduce energy consumption at the first location.

2. The energy management system of claim 1, the message data including:
   at least one of an audio output data or a video output data.

3. The energy management system of claim 1, wherein the program instructions further cause the one or more processors to at least:
   determine an incentive to present to the first location of the plurality of locations to incent a user at the first location.

4. The energy management system of claim 3, wherein the incentive is a reduced energy cost for at least the first location of the plurality of locations if a total energy consumed by the plurality of locations is reduced by at least the energy savings.

5. The energy management system of claim 1, wherein the program instructions when executed by the one or more processors further cause the one or more processors to at least:
   receive, from at least one of an energy distribution station, a transmission station, or a power station, third party data indicative of a load value on at least one of the energy distribution station, the transmission station, or the power station.

6. The energy management system of claim 1, wherein the program instructions when executed by the one or more processors further cause the one or more processors to at least:
   receive, from a weather service, third party data indicative of an anticipated weather pattern for the first location.

7. The energy management system of claim 1, wherein the program instructions when executed by the one or more processors further cause the one or more processors to at least:
   determine, for the first location of the plurality of locations, at least one of:
      a future point in time when programmatic altering of operation of the second appliance is to occur, or
      a condition that is to be satisfied before programmatic altering of operation of the second appliance is to occur; and
   include, in the command data, at least one of an indication of the future point in time or the condition.

8. The energy management system of claim 1, wherein the program instructions further cause the one or more processors to at least:
   receive, from a sensor at the first location of the plurality of locations, sensor data corresponding to a condition at the first location; and
   process the sensor data to determine at least one of the message data or the command data.

9. The energy management system of claim 1, wherein the message data further includes a recommendation to alter an operation of the second appliance.

10. A computer implemented method, comprising:
    determining a group that includes a plurality of locations;
    determining a threshold for the group to achieve an energy savings from the group;
    determining a value associated with the group, the value indicative of a likelihood that the group will comply with an energy savings request;
    determining that the value satisfies the threshold; and
    in response to determining that the value satisfies the threshold, sending, to a first location of the plurality of locations, at least one of:
       message data indicating a first appliance at the first location whose operation is to be altered by a user to reduce energy consumption at the first location; or
       command data to cause programmatic altering of operation of a second appliance to reduce energy consumption at the first location.

11. The computer implemented method of claim 10, further comprising:
    determining an incentive to present to at least the first location of the plurality of locations to incent a user at the first location.

12. The computer implemented method of claim 10, further comprising:
    determining at least one of:
       a future point in time when programmatic altering of operation of the second appliance is to occur, or
       a condition that is to be satisfied before programmatic altering of operation of the second appliance is to occur; and
    including, in the command data, at least one of an indication of the future point in time or the condition.

13. The computer implemented method of claim 10, further comprising:
    receiving, from a sensor at the first location of the plurality of locations, sensor data corresponding to a condition at the first location; and
    processing the sensor data to determine at least one of the message data or the command data.

14. The computer implemented method of claim 10, further comprising:
    determining an expected increase in a power demand at a power station;
    determining that the expected increase in the power demand will exceed a capacity of the power station; and
    in response to determining that the expected increase in the power demand will exceed the capacity of the power station, determining the energy savings from the group.

15. The computer implemented method of claim 10, further comprising:
    determining an amount of energy savings needed to reduce a cost of power; and
    wherein the energy savings from the group is based at least in part on the amount of energy savings needed to reduce the cost of power.

16. The computer implemented method of claim 15, further comprising:
    determining a second group that includes a second plurality of locations;
    determining a second energy savings from the second group; and
    wherein the amount of energy savings needed to reduce the cost of power is realized based at least in part on the energy savings from the group and the second energy savings from the second group.

17. A method, comprising:
    determining a group that includes a plurality of locations;
    determining a threshold for the group to achieve an energy savings from the group;
    determining a value associated with the group, the value indicative of a likelihood that the group will comply with an energy savings request;
    determining that the value satisfies the threshold; and
    in response to determining that the value satisfies the threshold, sending to a communication component associated with a first location of the plurality of locations, command data to cause programmatic altering of operation of a first appliance to reduce energy consumption at the first location.

18. The method of claim 17, wherein the communication component is further configured to communicate with the first appliance and cause the programmatic altering of operation of the first appliance.

19. The method of claim 17, further comprising:
determining an incentive for the first location to incent a user at the first location.

20. The method of claim 17, further comprising:
receiving data from at least one of an energy distribution station, a transmission station, or a power station; and
wherein the energy savings from the group is determined based at least in part on the data.

* * * * *